US010863456B2

(12) United States Patent
Chen et al.

(10) Patent No.: US 10,863,456 B2
(45) Date of Patent: *Dec. 8, 2020

(54) SYSTEMS AND METHODS OF COMMUNICATING VIA SUB-BANDS IN WIRELESS COMMUNICATION NETWORKS

(71) Applicant: QUALCOMM Incorporated, San Diego, CA (US)

(72) Inventors: Jialing Li Chen, San Diego, CA (US); Bin Tian, San Diego, CA (US); Lin Yang, San Diego, CA (US); Sameer Vermani, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/154,621

(22) Filed: Oct. 8, 2018

(65) Prior Publication Data
US 2019/0109684 A1 Apr. 11, 2019

Related U.S. Application Data

(60) Provisional application No. 62/625,293, filed on Feb. 1, 2018, provisional application No. 62/586,081, filed
(Continued)

(51) Int. Cl.
*H04W 52/36* (2009.01)
*H04W 52/16* (2009.01)
(Continued)

(52) U.S. Cl.
CPC ........ *H04W 52/367* (2013.01); *H04B 1/7156* (2013.01); *H04L 5/001* (2013.01);
(Continued)

(58) Field of Classification Search
CPC . H04W 52/367; H04W 52/16; H04W 52/225; H04W 52/262; H04W 52/281;
(Continued)

(56) References Cited

U.S. PATENT DOCUMENTS 8,150,478 B2    4/2012   Perets et al.
8,855,131 B2   10/2014   Imamura et al.
(Continued)

FOREIGN PATENT DOCUMENTS

EP         2557708 A1    2/2013
WO    WO-2013188030 A2  12/2013
(Continued)

OTHER PUBLICATIONS

International Search Report and Written Opinion—PCT/US2018/055056—ISA/EPO—dated Jan. 24, 2019.

*Primary Examiner* — Obaidul Huq
(74) *Attorney, Agent, or Firm* — Kevin M. Donnelly; Holland & Hart LLP

(57) ABSTRACT

Methods and apparatuses are disclosed for communicating over a wireless communication network. One such apparatus can include a memory that stores instructions and a processor coupled with the memory. The processor and the memory can be configured to identify a transmission mode for a transmission of a signal; select a tone plan for transmission of the signal within a 320 MHz total channel bandwidth or a 240 MHz total channel bandwidth, where the tone plan includes a 256 point tone plan, 512 point tone plan, 1024 point tone plane, 2048 point tone plan, 4096 point tone plan, or some combination thereof, and where the tone plan is selected based at least in part on the transmission mode; generate the signal according to the tone plan; and transmit the signal over the 320 MHz total channel bandwidth or over the 240 MHz total channel bandwidth.

32 Claims, 32 Drawing Sheets

Related U.S. Application Data on Nov. 14, 2017, provisional application No. 62/571,207, filed on Oct. 11, 2017, provisional application No. 62/582,260, filed on Nov. 6, 2017.

(51) Int. Cl.

| | |
|---|---|
| *H04B 1/7156* | (2011.01) |
| *H04W 72/04* | (2009.01) |
| *H04L 5/00* | (2006.01) |
| *H04L 25/03* | (2006.01) |
| *H04W 52/26* | (2009.01) |
| *H04W 52/22* | (2009.01) |
| *H04L 27/26* | (2006.01) |
| *H04W 52/28* | (2009.01) |

(52) U.S. Cl.
CPC .......... *H04L 5/003* (2013.01); *H04L 5/0007* (2013.01); *H04L 5/0037* (2013.01); *H04L 5/0048* (2013.01); *H04L 25/03834* (2013.01); *H04L 27/2602* (2013.01); *H04L 27/2605* (2013.01); *H04W 52/16* (2013.01); *H04W 52/225* (2013.01); *H04W 52/262* (2013.01); *H04W 52/281* (2013.01); *H04W 72/0453* (2013.01); *H04B 2001/71563* (2013.01); *H04L 27/26* (2013.01)

(58) Field of Classification Search
CPC ............ H04W 72/0453; H04B 1/7156; H04B 2001/71563; H04L 5/0007; H04L 5/001; H04L 5/003; H04L 5/0037; H04L 5/0048; H04L 25/03834; H04L 27/2602; H04L 27/2605; H04L 27/26
USPC .......................................... 370/310, 328, 329
See application file for complete search history.

(56) References Cited

U.S. PATENT DOCUMENTS

| | | | |
|---|---|---|---|
| 8,923,437 | B2 | 12/2014 | Geile |
| 9,160,503 | B2 | 10/2015 | Kim et al. |
| 9,281,924 | B2 | 3/2016 | Abraham et al. |
| 9,350,477 | B1 | 5/2016 | Jung et al. |
| 9,525,522 | B2 | 12/2016 | Yang et al. |
| 9,560,606 | B2 | 1/2017 | Seyama |
| 9,571,256 | B2 | 2/2017 | Azizi et al. |
| 9,813,206 | B2 | 11/2017 | Kim et al. |
| 9,832,059 | B2 | 11/2017 | Zhang et al. |
| 9,860,048 | B2 | 1/2018 | Lim et al. |
| 10,355,956 | B2 | 7/2019 | Yang et al. |
| 10,362,574 | B2 | 7/2019 | Chendamarai Kannan et al. |
| 10,506,596 | B2 | 12/2019 | Yerramalli |
| 2015/0223246 | A1* | 8/2015 | Yang ................. H04W 4/12 370/329 |
| 2015/0349995 | A1* | 12/2015 | Zhang ................. H04L 27/2613 375/295 |
| 2016/0218844 | A1 | 7/2016 | Suh et al. |
| 2016/0353435 | A1* | 12/2016 | Ghosh ................. H04W 74/002 |
| 2017/0273083 | A1 | 9/2017 | Chen et al. |
| 2019/0110261 | A1 | 4/2019 | Chen et al. |
| 2019/0253296 | A1 | 8/2019 | Chen et al. |
| 2020/0100251 | A1 | 3/2020 | Yerramalli |

FOREIGN PATENT DOCUMENTS

| | | |
|---|---|---|
| WO | WO-2015099803 A1 | 7/2015 |
| WO | WO-2015187720 A2 | 12/2015 |

\* cited by examiner

*Maximum number of RUs for each channel width

| RU type | CBW20 | CBW40 | CBW80 | CBW80+80 and CBW160 | CBW80×4, CBW80+80×2, CBW160×2 and CBW320 |
|---|---|---|---|---|---|
| 26-tone RU | 9 | 18 | 37 | 74 | 148 |
| 52-tone RU | 4 | 8 | 16 | 32 | 64 |
| 106-tone RU | 2 | 4 | 8 | 16 | 32 |
| 242-tone RU | 1 | 2 | 4 | 8 | 16 |
| 484-tone RU | N/A | 1 | 2 | 4 | 8 |
| 996-tone RU | N/A | N/A | 1 | 2 | 4 |
| 2x996 tone RU | N/A | N/A | N/A | 1 | 2 |
| 4x996 tone RU | N/A | N/A | N/A | N/A | 1 |

FIG. 4B

| | Sym Dur | Tone Spacing | 80MHz | 160MHz | 320MHz |
|---|---|---|---|---|---|
| Option 1 | 1x | 312.5kHz | 256 | 512 | 1024 |
| Option 2 | 2x | 156.25kHz | 512 | 1024 | 2048 |
| Option 3 | 4x | 78.125kHz | 1024 | 2048 | 4096 |

FIG. 5A

| FFT Size | 256 | 512 | 1024 | 2048 | 4096 |
|---|---|---|---|---|---|
| Index Range | [-128, 127] | [-256, 255] | [-512, 511] | [-1024, 1023] | [-2048, 2047] |

FIG. 5B

| Sym Dur | 80MHz | | | 160MHz | | | 320MHz | | |
|---|---|---|---|---|---|---|---|---|---|
| | FFT Size | Tone Plan | | FFT Size | Tone Plan | | FFT Size | Tone Plan | |
| 1x | 256 | (1) 11ac 80MHz; (2) 11ax 20MHz upclocked by 4 | | 512 | (1) 11ac 160MHz; (2) 11ax 40MHz upclocked by 4 | | 1024 | (1) 11ax 80MHz upclocked by 4; (2) Duplicate two 11ac 160MHz | |
| 2x | 512 | | | 1024 | | | 2048 | (1) 11ax 160MHz; (2) New 2048-pt tone plans | |
| 4x | 1024 | 11ax 80MHz | | 2048 | (1) 11ax 160MHz; (2) New 2048-pt tone plans | | 4096 | (1) Duplicate two 11ax 160MHz; (2) New 4096-pt tone plans | |

FIG. 5C

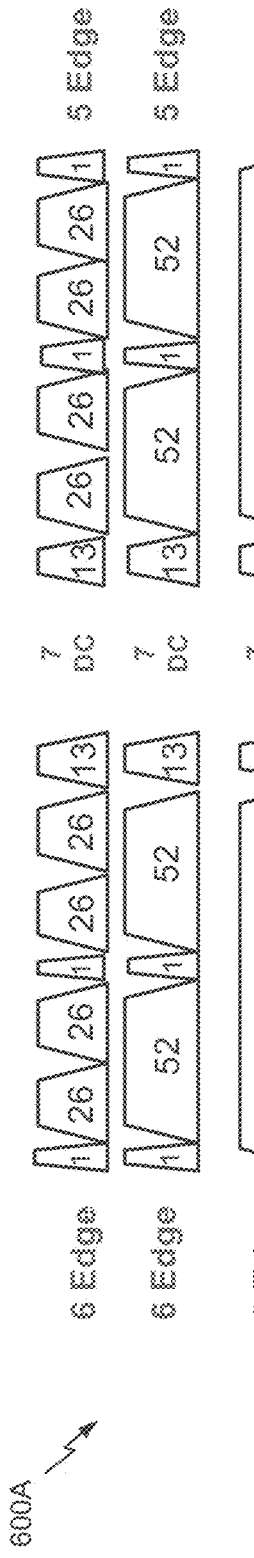
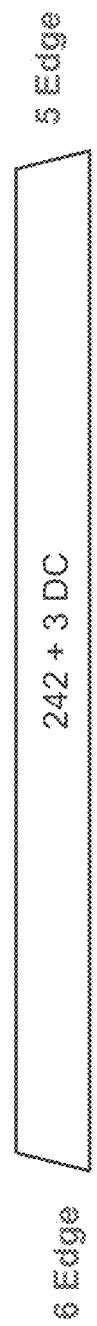
FIG. 6A
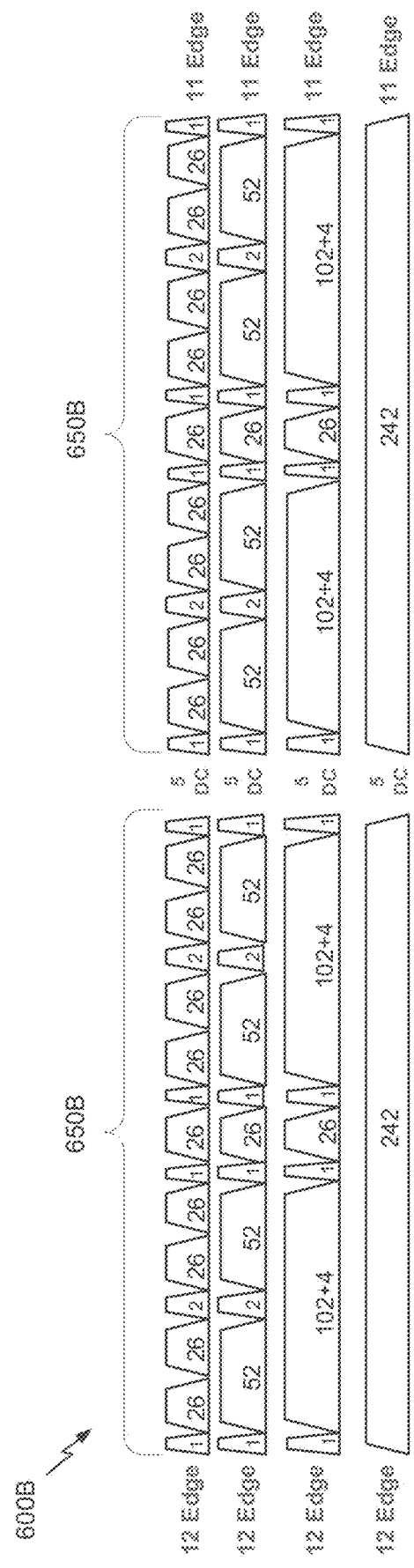
FIG. 6B

FIG. 6D

| Channel Width | RU Size | Subcarrier Indices |
|---|---|---|
| 160 MHz Option 1 | 26, 52, 106, 242, 484, 996 | Subcarrier indices in lower 80 MHz −512, subcarrier indices in upper 80 MHz +512 |
| 160 MHz Option 2 | 26, 52, 106, 242, 484, 996 | Subcarrier indices in lower 80 MHz +500.5−y/2, subcarrier indices in upper 80 MHz +500.5+y/2, where y is odd, 5≤y≤23 |
| 320 MHz Option 1a | 26, 52, 106, 242, 484, 996 | Subcarrier indices in lowest 80 MHz −1536, subcarrier indices in second lowest 80 MHz −512, subcarrier indices in second upmost 80 MHz +512, subcarrier indices in upmost 80 MHz +1536 |
| 320 MHz Option 1b | 26, 52, 106, 242, 484, 996 | Subcarrier indices in lowest 80 MHz −1524.5−y/2, subcarrier indices in second lowest 80 MHz −523.5−y/2, subcarrier indices in second upmost 80 MHz +523.5+y/2, subcarrier indices in upmost 80 MHz +1524.5+y/2, where y is odd, 5≤y≤23 |
| 320 MHz Option 2a | 26, 52, 106, 242, 484, 996 | Subcarrier indices in lowest 80 MHz −1524.5−z/2, subcarrier indices in second lowest 80 MHz −500.5−z/2, subcarrier indices in second upmost 80 MHz +500.5+z/2, subcarrier indices in upmost 80 MHz +1524.5+z/2, where z is odd, 5≤z≤23 |
| 320 MHz Option 2b | 26, 52, 106, 242, 484, 996 | Subcarrier indices in lowest 80 MHz −1513−y/2−z/2, subcarrier indices in second lowest 80 MHz −512−y/2+z/2, subcarrier indices in upmost 80 MHz +512+y/2−z/2, subcarrier indices in second upmost 80 MHz +1513+y/2+z/2, where y & z are odd, 5≤y≤23, 5≤z≤23 |

\* RUs' tone indices, Null, Data & Pilot subcarrier indices

FIG. 7

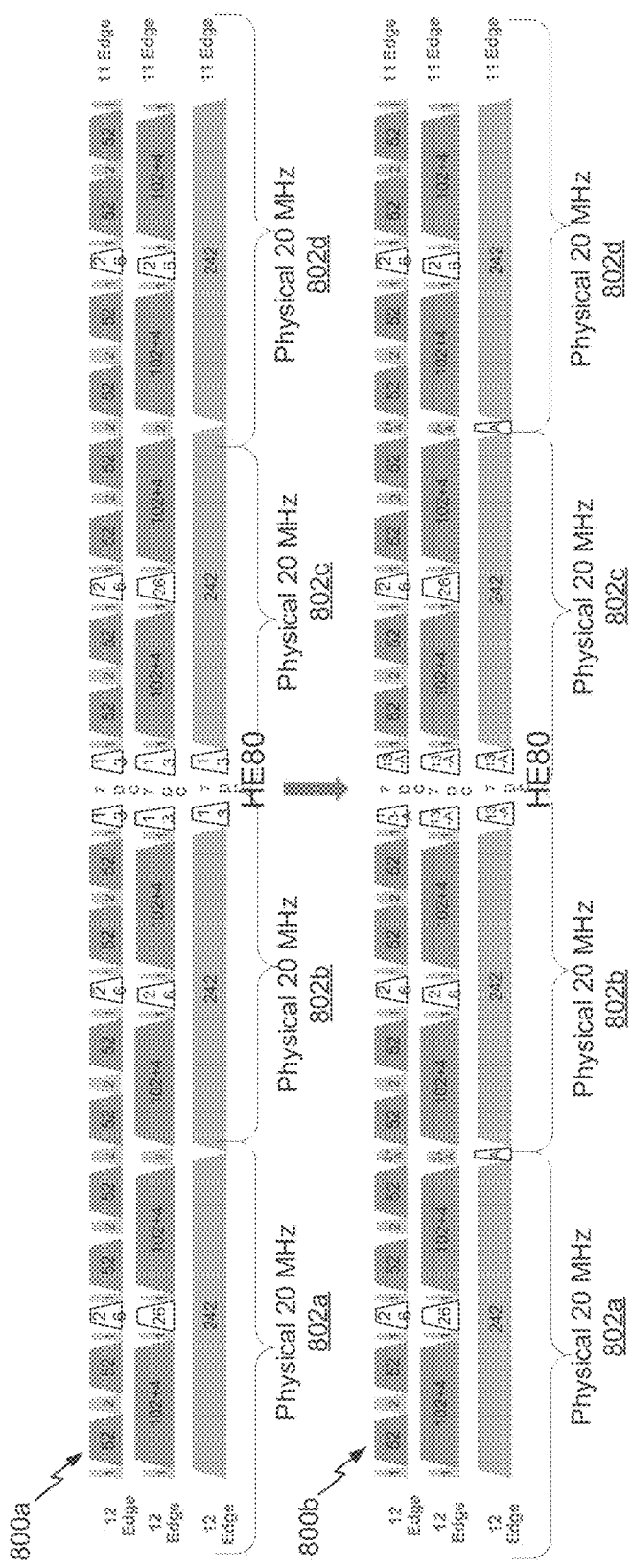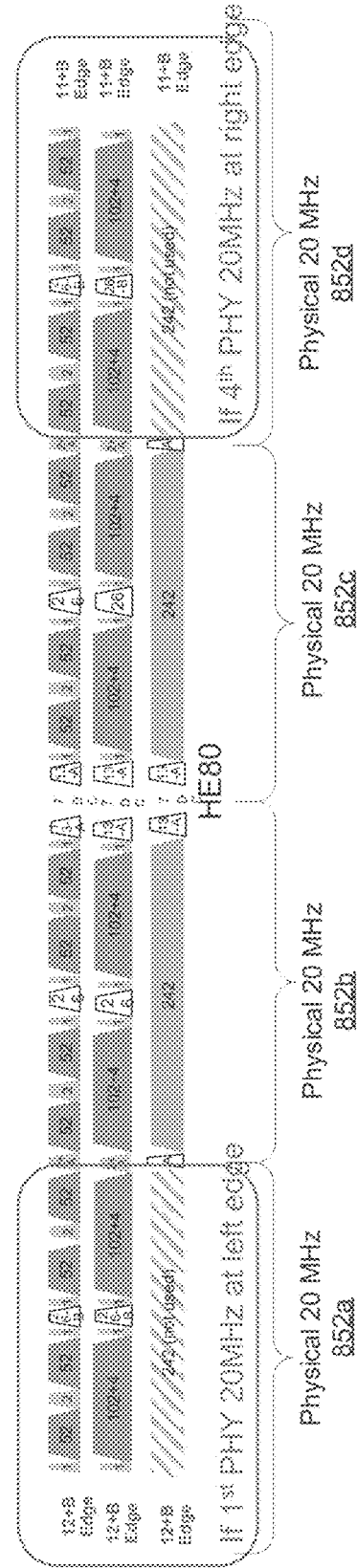
FIG. 8A
FIG. 8B

| BW | 80MHz FFT | 80MHz Tone Plan | 160MHz FFT | 160MHz Tone Plan | 320MHz FFT | 320MHz Tone Plan |
|---|---|---|---|---|---|---|
| 1x (VHT based) | 256 | (1) VHT80, (2) New derived from VHT20/40/80 | 512 | (1) VHT80, (2) New derived from VHT20/40/80 | 1024 | (1) Formed by VHT20/40/80 in PHY20/40/80, depending on OFDMA allocations |
| 1x (HE based) | | (2) Modified from (1) | | (3) Modified from (2) | | (3) Modified from (2) |
| 4x | 1024 | HE80 | 2048 | (1) HE160, (2) Modified tone plans based on (1) | 4096 | (1) Duplicate two HE160; (2) Modified tone plans based on (1) |
| 2x (VHT based) | 512 | (2) New derived from VHT40/80 | 1024 | New derived from VHT40/80 | 2048 | (1) Formed by VHT20/40/80 downclocked by 2 in PHY10/20/40, depending on OFDMA allocations |
| 2x (HE based) | | HE40 upclocked by 2 | | (1) HE80 upclocked by 2; (2) Duplicate two HE40 upclocked by 2 | | (1) HE160 upclocked by 2; (2) Duplicate four HE40 upclocked by 2 |

FIG. 12

| Sym Dur | 20MHz 64 FFT | 40MHz 128 FFT | 80MHz 256 FFT | 160MHz 512 FFT | 320MHz 1024 FFT |
|---|---|---|---|---|---|
| 1x (VHT based) | VHT20 | VHT40 | VHT80 | VHT160 | Formed by VHT20/40/80 in PHY20/40/80, depending on OFDMA allocations |
| 1x (HE based) | N/A | N/A | HE20 unlocked by 4 | (1) Duplicate two HE20 unlocked by 4, (2) HE40 unlocked by 4 | (1) Duplicate four HE20 unlocked by 4, (2) HE80 unlocked by 4 |
| 1x (new) | New 64-pt design | New 128-pt design | New 256-pt design | New 512-pt design | New 1024-pt design |

| | 20MHz (256) PPDU | 20MHz (256) PPDU | 40MHz (512) PPDU | 80MHz (1024) PPDU | 160MHz (2048) PPDU | 320MHz (4096) PPDU |
|---|---|---|---|---|---|---|
| 4x (HE based) | HE20 | HE20 | HE40 | HE80 | (1) HE160; (2) Modified tone plans based on (1) | (1) Duplicate two HE160; (2) Modified tone plans based on (1) |
| 4x (new) | New 256-pt design | New 256-pt design | New 512-pt design | New 1024-pt design | New 2048-pt design | New 4096-pt design |

FIG. 13C

SYSTEMS AND METHODS OF COMMUNICATING VIA SUB-BANDS IN WIRELESS COMMUNICATION NETWORKS

CROSS REFERENCES

The present Application for Patent claims the benefit of U.S. Provisional Patent Application No. 62/582,260 by CHEN, et al., entitled "SPECTRAL MASK AND FLATNESS FOR WIRELESS LOCAL AREA NETWORKS," filed Nov. 6, 2017, and to U.S. Provisional Patent Application No. 62/571,207 by CHEN, et al., entitled "SYSTEMS AND METHODS OF COMMUNICATING VIA SUB-BANDS IN WIRELESS COMMUNICATION NETWORKS", filed Oct. 11, 2017, and to U.S. Provisional Patent Application No. 62/586,081 by CHEN, et al., entitled, "SYSTEMS AND METHODS OF COMMUNICATING VIA SUB-BANDS IN WIRELESS COMMUNICATION NETWORKS" filed Nov. 14, 2017, and to U.S. Provisional Patent Application No. 62/625,293 by CHEN, et al, entitled "SYSTEMS AND METHODS OF COMMUNICATING VIA SUB-BANDS IN WIRELESS COMMUNICATION NETWORKS" filed Feb. 1, 2018, assigned to the assignee hereof, and expressly incorporated herein.

FIELD

Certain aspects of the present disclosure generally relate to wireless communications, and more particularly, to methods and apparatuses for communicating via 320 MHz sub-bands.

BACKGROUND

In many telecommunication systems, communications networks can be used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks may be preferred when the network elements can be mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices may be in a communication network, congestion and inefficient link usage may result. As such, systems, methods, and non-transitory computer-readable media may be needed for improving communication efficiency in wireless networks.

SUMMARY

Various implementations of systems, methods and devices within the scope of the appended claims each have several aspects, no single one of which can be solely responsible for the desirable attributes described herein. Without limiting the scope of the appended claims, some prominent features can be described herein.

Details of one or more implementations of the subject matter described in this specification can be set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus configured to communicate over a wireless communication network. One such apparatus can include a memory that stores instructions and a processor coupled with the memory. The processor and the memory can be configured to generate a message according to a tone plan for transmission to multiple destination devices within a 320 MHz total channel bandwidth including one of (1) a contiguous 320 MHz frequency band, (2) two disjoint, contiguous 160 MHz frequency bands, (3) three disjoint frequency bands comprising a single contiguous 160 MHz frequency band and two contiguous 80 MHz frequency bands, and (4) four disjoint, contiguous 80 MHz frequency bands and provide the message for transmission over the 320 MHz bandwidth or a 240 MHz total channel bandwidth including one of (1) two disjoint, contiguous frequency bands, one a 160 MHz frequency band and the other an 80 MHz frequency band, (2) three non-contiguous 80 MHz frequency bands, and (3) a contiguous 240 MHz frequency band.

A method of wireless communication is described. The method may include identifying a transmission mode for a transmission of a signal, selecting a tone plan for transmission of the signal within a 320 MHz total channel bandwidth or a 240 MHz total channel bandwidth, where the tone plan includes a 256 point tone plan, a 512 point tone plan, a 1024 point tone plane, a 2048 point tone plan, a 4096 point tone plan, or some combination thereof, and where the tone plan is selected based on the transmission mode, generating the signal according to the tone plan, transmitting the signal over the 320 MHz total channel bandwidth or over the 240 MHz total channel bandwidth, and where the selected tone plan includes at least one 80 MHz tone plan, 160 MHz tone plan, 240 MHz tone plan, or 320 MHz tone plan.

An apparatus for wireless communication is described. The apparatus may include a processor, memory in electronic communication with the processor, and instructions stored in the memory. The instructions may be executable by the processor to cause the apparatus to identify a transmission mode for a transmission of a signal, select a tone plan for transmission of the signal within a 320 MHz total channel bandwidth or a 240 MHz total channel bandwidth, where the tone plan includes a 256 point tone plan, a 512 point tone plan, a 1024 point tone plane, a 2048 point tone plan, a 4096 point tone plan, or some combination thereof, and where the tone plan is selected based on the transmission mode, generate the signal according to the tone plan, transmit the signal over the 320 MHz total channel bandwidth or over the 240 MHz total channel bandwidth, and where the selected tone plan includes at least one 80 MHz tone plan, 160 MHz tone plan, 240 MHz tone plan, or 320 MHz tone plan.

Another apparatus for wireless communication is described. The apparatus may include means for identifying a transmission mode for a transmission of a signal, selecting a tone plan for transmission of the signal within a 320 MHz total channel bandwidth or a 240 MHz total channel bandwidth, where the tone plan includes a 256 point tone plan, a 512 point tone plan, a 1024 point tone plane, a 2048 point tone plan, a 4096 point tone plan, or some combination thereof, and where the tone plan is selected based on the transmission mode, generating the signal according to the tone plan, transmitting the signal over the 320 MHz total channel bandwidth or over the 240 MHz total channel bandwidth, and where the selected tone plan includes at least one 80 MHz tone plan, 160 MHz tone plan, 240 MHz tone plan, or 320 MHz tone plan.

A non-transitory computer-readable medium storing code for wireless communication is described. The code may include instructions executable by a processor to identify a transmission mode for a transmission of a signal, select a tone plan for transmission of the signal within a 320 MHz total channel bandwidth or a 240 MHz total channel bandwidth, where the tone plan includes a 256 point tone plan, a 512 point tone plan, a 1024 point tone plane, a 2048 point tone plan, a 4096 point tone plan, or some combination thereof, and where the tone plan is selected based on the transmission mode, generate the signal according to the tone plan, transmit the signal over the 320 MHz total channel bandwidth or over the 240 MHz total channel bandwidth, and where the selected tone plan includes at least one 80 MHz tone plan, 160 MHz tone plan, 240 MHz tone plan, or 320 MHz tone plan.

In some examples of the method, apparatuses, and non-transitory computer-readable medium described herein, a 1× symbol duration of 3.2 μs with 312.5 kHz between subsequent tones, a 2× symbol duration of 6.4 μs with 156.25 kHz between subsequent tones, or a 4× symbol duration of 12.8 μs with 78.125 kHz between subsequent tones.

In some examples of the method, apparatuses, and non-transitory computer-readable medium described herein, the 320 MHz total channel bandwidth or the 240 MHz total channel bandwidth may include operations, features, means, or instructions for the 1× symbol duration, the 2× symbol duration, or the 4× symbol duration.

In some examples of the method, apparatuses, and non-transitory computer-readable medium described herein, the 4× symbol duration may be used with a 20 MHz tone plan including 11 guard tones and 3 direct current tones.

In some examples of the method, apparatuses, and non-transitory computer-readable medium described herein, the 4× symbol duration may be used with a 40 MHz tone plan or an 80 MHz tone plan, including 23 guard tones and 5 or 7 direct current tones.

In some examples of the method, apparatuses, and non-transitory computer-readable medium described herein, the 2× symbol duration may be used with the 2048 point tone plan.

In some examples of the method, apparatuses, and non-transitory computer-readable medium described herein, the 320 MHz total channel bandwidth or the 240 MHz total channel bandwidth includes the 1× symbol duration based on 4× tone plans upclocked by 4.

In some examples of the method, apparatuses, and non-transitory computer-readable medium described herein, the 320 MHz total channel bandwidth or the 240 MHz total channel bandwidth includes the 2× symbol duration based on 4× tone plans upclocked by 2.

In some examples of the method, apparatuses, and non-transitory computer-readable medium described herein, the transmission mode may include operations, features, means, or instructions for a contiguous 320 MHz frequency band, two disjoint, contiguous 160 MHz frequency bands, three disjoint frequency bands including a single contiguous 160 MHz frequency band and two contiguous 80 MHz frequency bands, four disjoint, contiguous 80 MHz frequency bands, two disjoint, contiguous frequency bands including a first 160 MHz frequency band and the other an 80 MHz frequency band, three non-contiguous 80 MHz frequency bands; or and a contiguous 240 MHz frequency band.

In some examples of the method, apparatuses, and non-transitory computer-readable medium described herein, a single 320 MHz tone plan and two duplicate 160 MHz frequency tone plans, each duplicate 160 MHz frequency tone plan in one 160 MHz physical layer (PHY) sub-band or four duplicate 80 MHz tone plans, each duplicate 80 MHz tone plane in one 80 MHz PHY sub-band when the 320 MHz total channel bandwidth may be the contiguous 320 MHz frequency band.

Some examples of the method, apparatuses, and non-transitory computer-readable medium described herein may further include operations, features, means, or instructions for two 160 MHz tone plans, each 160 MHz tone plan in one 160 MHz physical layer (PHY) sub-band or four duplicate 80 MHz tone plans, each duplicate 80 MHz tone plan in one 80 MHz PHY sub-band when the 320 MHz total channel bandwidth may be the two disjoint, contiguous 160 MHz frequency bands.

In some examples of the method, apparatuses, and non-transitory computer-readable medium described herein, the 320 MHz total channel bandwidth uses the three disjoint frequency bands including the single contiguous 160 MHz frequency band and the two contiguous 80 MHz frequency bands and the transmission mode uses a single 160 MHz tone plan or two duplicate 80 MHz tone plans in one 160 MHz PHY sub-band, and two duplicate 80 MHz tone plans, each duplicate 80 MHz tone plan in one 80 MHz PHY sub-band.

In some examples of the method, apparatuses, and non-transitory computer-readable medium described herein, the 320 MHz total channel bandwidth uses the four disjoint, contiguous 80 MHz frequency bands and the transmission mode uses four duplicate 80 MHz tone plans, each in one 80 MHz PHY sub-band.

In some examples of the method, apparatuses, and non-transitory computer-readable medium described herein, the 240 MHz total channel bandwidth uses the two disjoint frequency bands including the first 160 MHz frequency band and the 80 MHz frequency band and the transmission mode uses a single 160 MHz tone plan in one 160 MHz PHY sub-band and a single 80 MHz tone plans, each duplicate 80 MHz tone plan in one 80 MHz PHY sub-band.

In some examples of the method, apparatuses, and non-transitory computer-readable medium described herein, the 240 MHz total channel bandwidth may be the three non-contiguous 80 MHz frequency bands and the transmission mode uses three duplicate 80 MHz tone plans, each in one 80 MHz PHY sub-band.

In some examples of the method, apparatuses, and non-transitory computer-readable medium described herein, a single 240 MHz tone plan and one 160 MHz frequency tone plan and one 80 MHz tone plan, the one 160 MHz frequency tone plan may be in one 160 MHz physical layer (PHY) sub-band, or three duplicate 80 MHz tone plans, each duplicate 80 MHz tone plane in one 80 MHz PHY sub-band when the 240 MHz total channel bandwidth may be the contiguous 240 MHz frequency band.

In some examples of the method, apparatuses, and non-transitory computer-readable medium described herein, the 80 and 160 MHz frequency bands use equal symbol durations.

In some examples of the method, apparatuses, and non-transitory computer-readable medium described herein, a first frequency band that forms the 240 MHz or 320 MHz total channel bandwidth utilizes a different symbol duration from at least a second frequency band that forms the 240 MHz or 320 MHz total channel bandwidth.

In some examples of the method, apparatuses, and non-transitory computer-readable medium described herein, the tone plan includes at least one of a 26-, a 52-, a 106-, a 242-, a 484-, a 996-, a 2×996-, and a 4×996 tone resource unit.

In some examples of the method, apparatuses, and non-transitory computer-readable medium described herein, the tone plan includes a minimum resource unit size of 52 tones.

In some examples of the method, apparatuses, and non-transitory computer-readable medium described herein, the tone plan includes a minimum resource unit size of 106 tones.

In some examples of the method, apparatuses, and non-transitory computer-readable medium described herein, the apparatus may be an access point, and where the signal may be transmitted through a transmitter and an antenna of the access point to a mobile station served by the access point.

In some examples of the method, apparatuses, and non-transitory computer-readable medium described herein, the selected tone plan includes at least one 80 MHz tone plan or 160 MHz tone plan at least 23 guard tones, 5 direct current tones for non-orthogonal frequency division multiple access (OFDMA) communications or 7 direct current tones for multiple user communications; where the 2048 point tone plan includes up to 2020 data and pilot tones for non-OFDMA communications or up to 2018 data and pilot tones for multiple user communications, and the 4096 point tone plan includes up to 4068 data and pilot tones for non-OFDMA communications or up to 4066 data and pilot tones for multiple user communications.

BRIEF DESCRIPTION OF THE DRAWINGS

FIG. 4B is an illustration of a table of a number of resource units (RUs) available for each of a 20 MHz, a 40 MHz, an 80 MHz, a 160 MHz, and a 320 MHz channel FIGS. 5A through 5B show example tone spacings and index ranges for different fast Fourier transform (FFT) sizes and symbol durations at each of 80, 160, and 320 MHz transmissions, according to one embodiment.

FIG. 5C shows example tone plans that can be used with various FFT sizes and symbol durations at each of 80, 160, and 320 MHz transmissions, according to one embodiment.

FIGS. 6A through 6H show example 20 MHz, 40 MHz, 80 MHz, 160 MHz, and 320 MHz transmissions using 26-, 52-, 106-, 242-, 484-, 996- and/or other tone allocations, according to various embodiments.

FIG. 7 shows an example of RU subcarrier indices, according to one embodiment.

FIG. 8A shows an example modification of an 80 MHz SB tone plan for boundary alignment, according to one embodiment.

FIG. 8B shows another example modification of an 80 MHz SB tone plan for boundary alignment, according to another embodiment.

FIG. 12 shows example tone plans that can be used with various FFT sizes and symbol durations at each of 80, 160, and 320 MHz sub-band transmissions, according to one embodiment.

FIG. 13A shows example tone plans that can be used for 1× symbol duration tone plan design with various FFT sizes, according to one embodiment.

FIG. 13B shows example tone plans that can be used for 2× symbol duration tone plan design with various FFT sizes, according to one embodiment.

FIG. 13C shows example tone plans that can be used for 4× symbol duration tone plan design with various FFT sizes, according to one embodiment.

DETAILED DESCRIPTION

Figure 1:
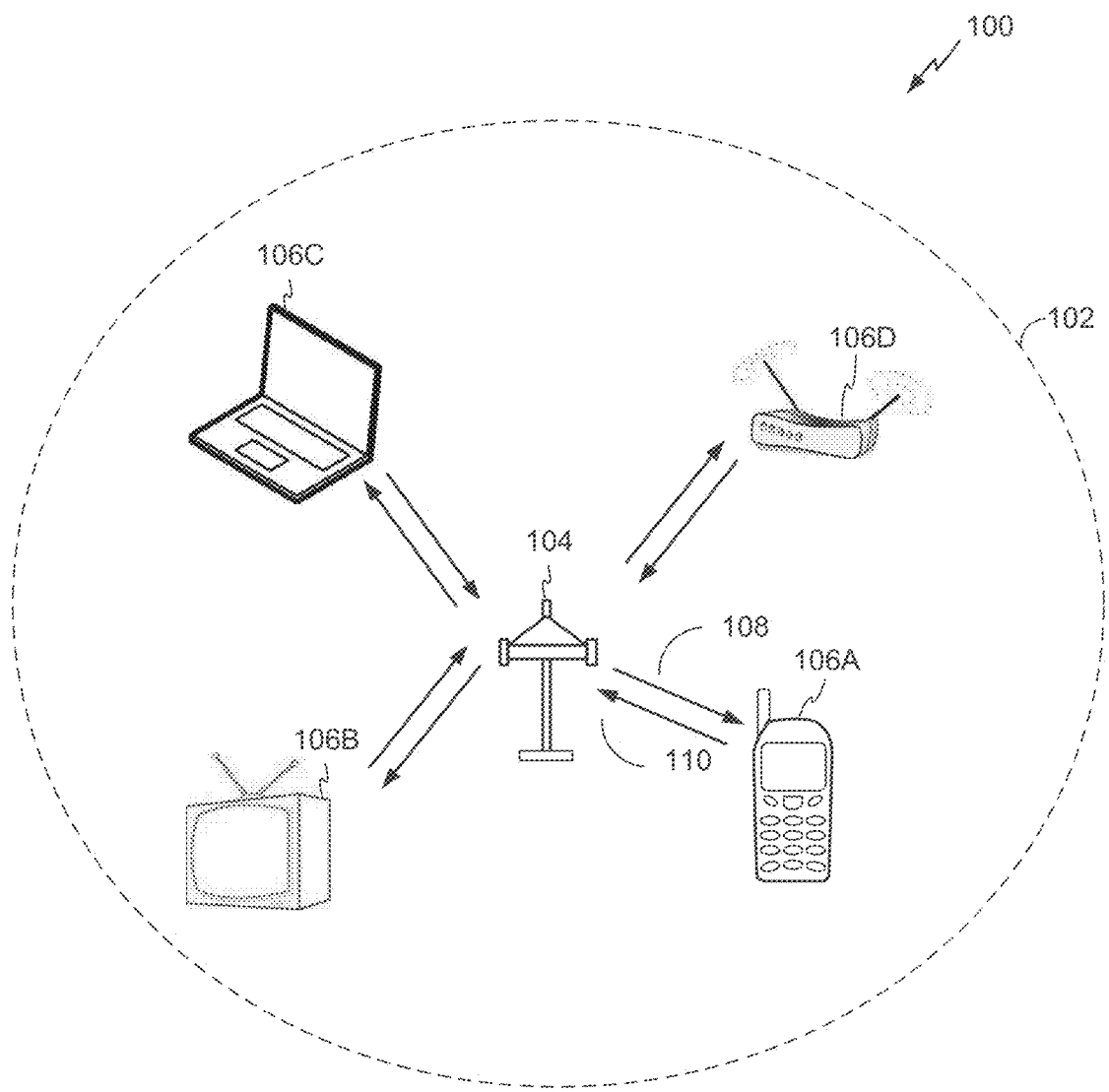
FIG. 1 illustrates an example of a wireless communication system in which aspects of the present disclosure can be employed.

Various aspects of the novel systems, apparatuses, and methods can be described more fully hereinafter with reference to the accompanying drawings. The teachings of this disclosure can, however, be embodied in many different forms and should not be construed as limited to any specific structure or function presented throughout this disclosure. Rather, these aspects can be provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects can be described herein, many variations and permutations of these aspects fall within the scope of the disclosure. Although some benefits and advantages of the preferred aspects can be mentioned, the scope of the disclosure is not intended to be limited to particular benefits, uses, or objectives. Rather, aspects of the disclosure can be intended to be broadly applicable to different wireless technologies, system configurations, networks, and transmission protocols, some of which can be illustrated by way of example in the figures and in the following description of the preferred aspects. The detailed description and drawings can be merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the Institute of Electrical and Electronics Engineers (IEEE) 802.11 family of wireless protocols (e.g., extreme high throughput (EHT) also referred to as ultra-high throughput (UHT) herein).

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which can be the components that access the wireless network. For example, there can be two types of devices: access points (APs) and clients (also referred to as stations (STAs)). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that can be based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement global system for mobile communications (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that can be distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols can be sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RB S"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
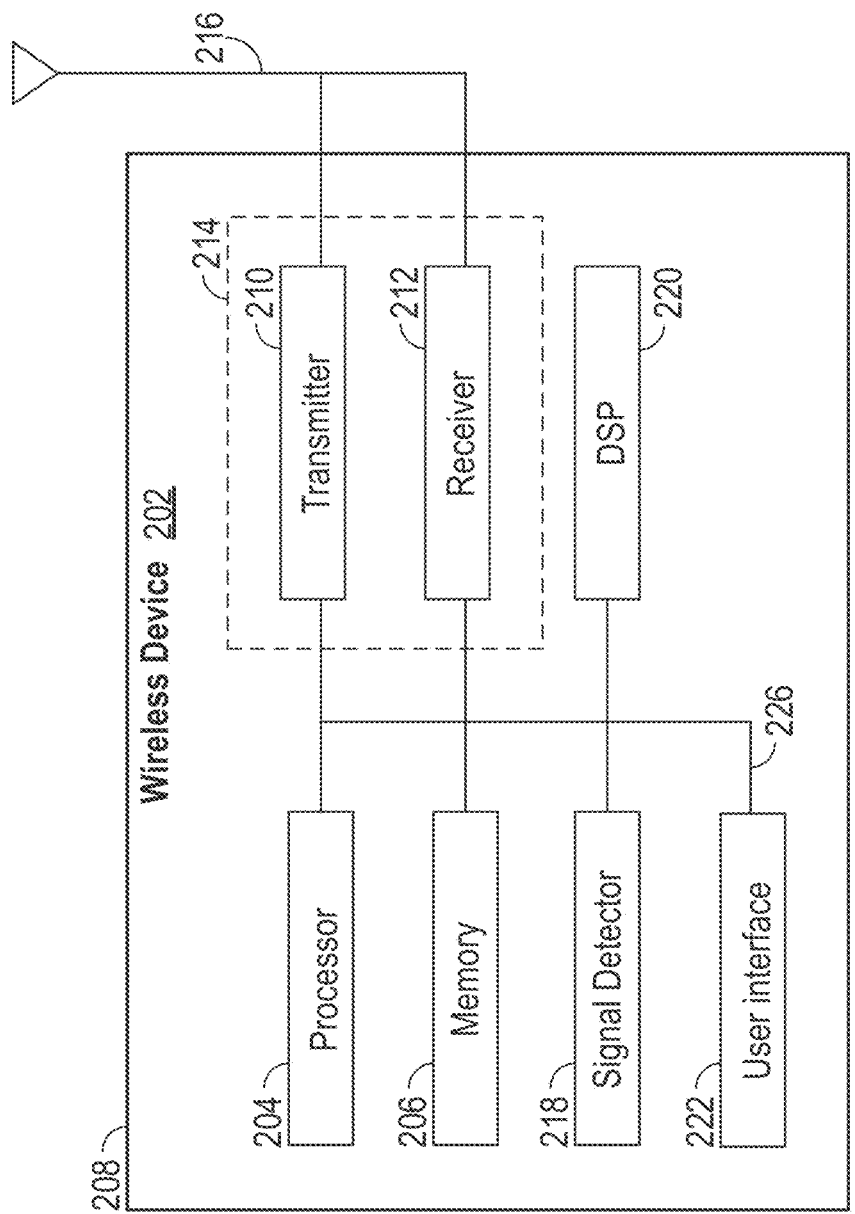
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple input multiple output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components can be illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, which may also be referred to as HE STAs, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 µs, a 2× symbol duration can be 6.4 µs, and a 4× symbol duration can be 12.8 µs. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design For Multicarrier Allocation

Figure 3:
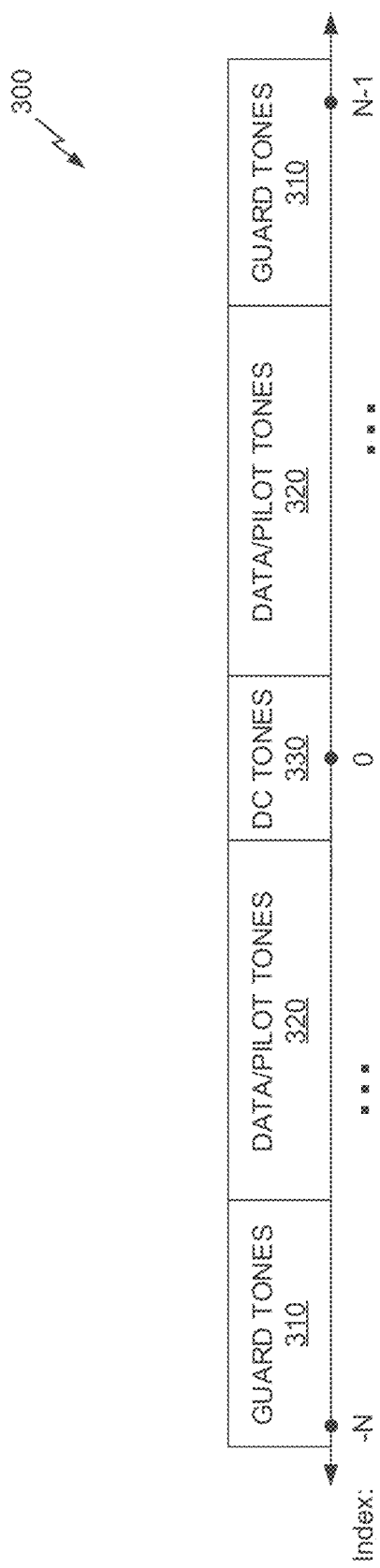
FIG. 3 shows an example 2N-tone plan, according to one embodiment.

FIG. 3 shows an example 2N-tone plan 300, according to one embodiment. In an embodiment, the tone plan 300 corresponds to OFDM tones, in the frequency domain, generated using a 2N-point fast Fourier transform (FFT). The tone plan 300 includes 2N OFDM tones indexed −N to N−1. The tone plan 300 includes two sets of edge or guard tones 310, two sets of data/pilot tones 320, and a set of direct current (DC) tones 330. In various embodiments, the edge or guard tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which can be each 12.8 µs in duration (whereas symbols in certain other IEEE 802.11 protocols may be 3.2 µs in duration).

In some aspects, OFDMA tone plans may be provided for transmission using a 2× symbol duration, as compared to various IEEE 802.11 protocols. For example, the 2× symbol duration may use a number of symbols which can be each 6.4 µs in duration (whereas symbols in certain other IEEE 802.11 protocols may be 3.2 µs or 12.8 µs in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, 80, 160, or 320 MHz (or a combination thereof), and it may be desirable to use a tone plan that can be used for any of these bandwidths. Further, a tone plan may be simple in that it uses a smaller number of building block sizes. For example, a tone plan may contain a unit which may be referred to as resource unit (RU). This unit may be used to assign a particular amount of wireless resources (for example, bandwidth and/or particular tones) to a particular user. For example, one user may be assigned bandwidth as a number of RUs, and the data/pilot tones 320 of a transmission may be broken up into a number of RUs.

A tone plan may also be chosen based on efficiency. For example, transmissions of different bandwidths (e.g., 20, 40, 80, 160, or 320 MHz, or a combination thereof) may have different numbers of tones. Reducing the number of leftover tones may be beneficial. Further, it may be beneficial if a tone plan is configured to preserve 20, 40, 80, 160, and/or 320 MHz boundaries, when needed. For example, it may be desirable to have a tone plan which allows each 20, 40, 80, 160, or 320 MHz portion to be decoded separately from each other, rather than having allocations which can be on the boundary between two different 20, 40, 80, 160, or 320 MHz portions of the bandwidth. For example, it may be beneficial for interference patterns to be aligned with 20, 40, 80, 160, or 320 MHz channels. Further, it may be beneficial to have channel bonding, which may also be known as preamble puncturing, such that when a 20 MHz transmission and a 40 MHz transmission can be transmitted, to create a 20 MHz "hole" in the transmission when transmitted over 80 MHz, 160 MHz, or 320 MHz. This may allow, for example, a legacy packet to be transmitted in this unused portion of the bandwidth. This puncturing may apply to any transmission (e.g., 20, 40, 80, 160, or 320 MHz, etc.) and may create "holes" of at least 20 MHz in the transmission regardless of the channel or bandwidth being used. Finally, it may also be advantageous to use a tone plan which provides for fixed pilot tone locations in various different transmissions, such as in different bandwidths.

As data transmission rate demands increase with additional devices joining networks or additional data being added for transmission over networks, larger channel bandwidths may be introduced, for example for orthogonal frequency-division multiple access (OFDMA) transmissions. In one example, tone plans for a 320 MHz total channel bandwidth may be introduced to assist in increasing peak system transmission data rates and to more efficiently utilize available channels. For example, as new frequencies are available for use (e.g., 6 GHz vs. previous 5 GHz), these new tone plans for the larger total channel bandwidths may more efficiently utilize the newly available channels. Moreover, an increased total bandwidth which may be provided by these new tone plans may allow for better rate vs range tradeoff. In this case, the same or a similar transmission rate may be used to provide larger coverage if a larger total bandwidth is used. Additionally, the larger total channel bandwidths may also increase tone plan efficiency (e.g., for a particular BW, how many tones could be used for data transmission) and may also increase a number of guard bands. As with any total channel bandwidth being used, different modes may be available depending on channel availability. For example, current 80 MHz channel bandwidths may be separated into 20 MHz, 40 MHz, or 80 MHz modes.

Figure 4A:
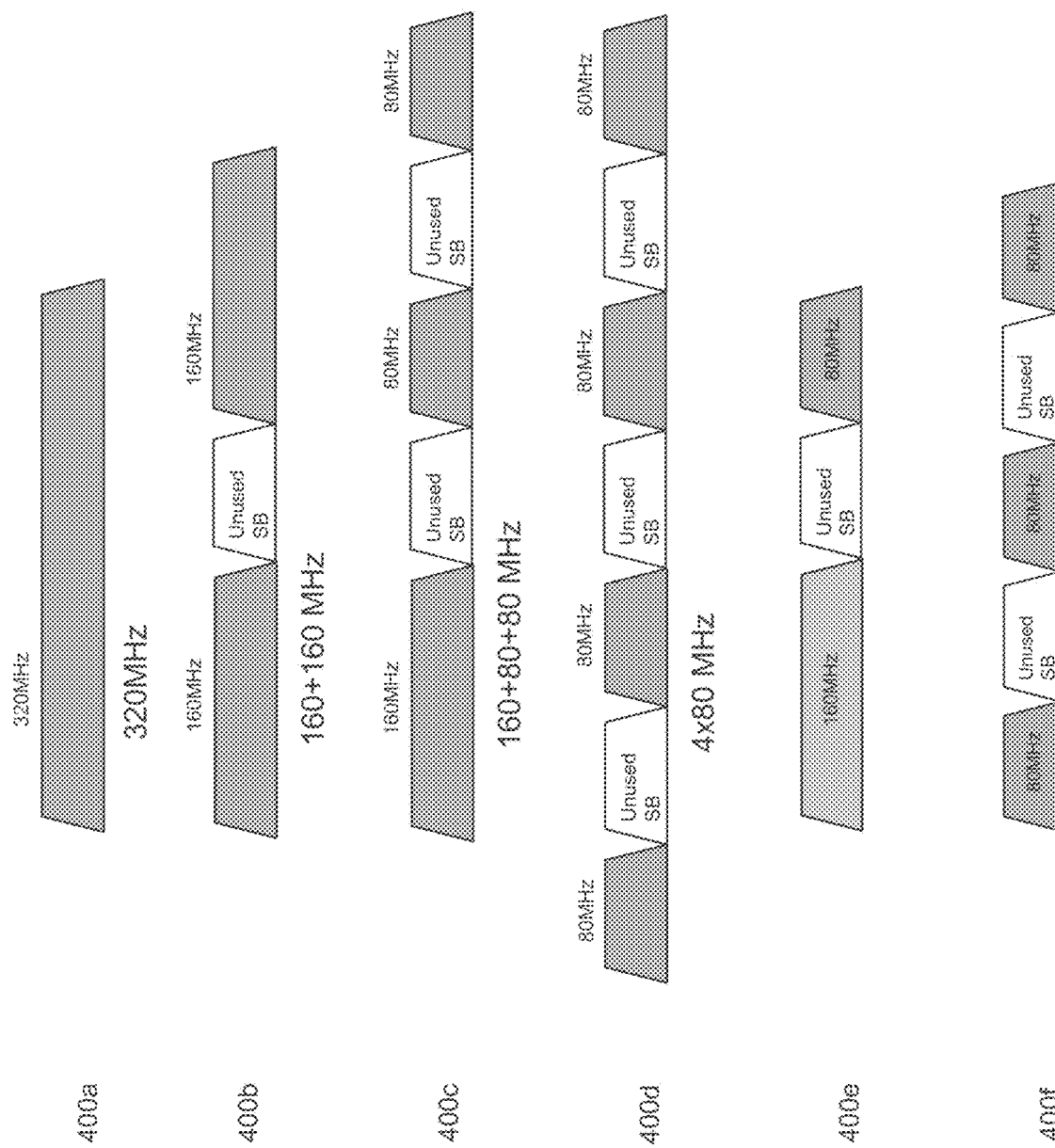
FIG. 4A is an illustration of different modes available for a 240 or 320 MHz transmission.
Figure 4A:
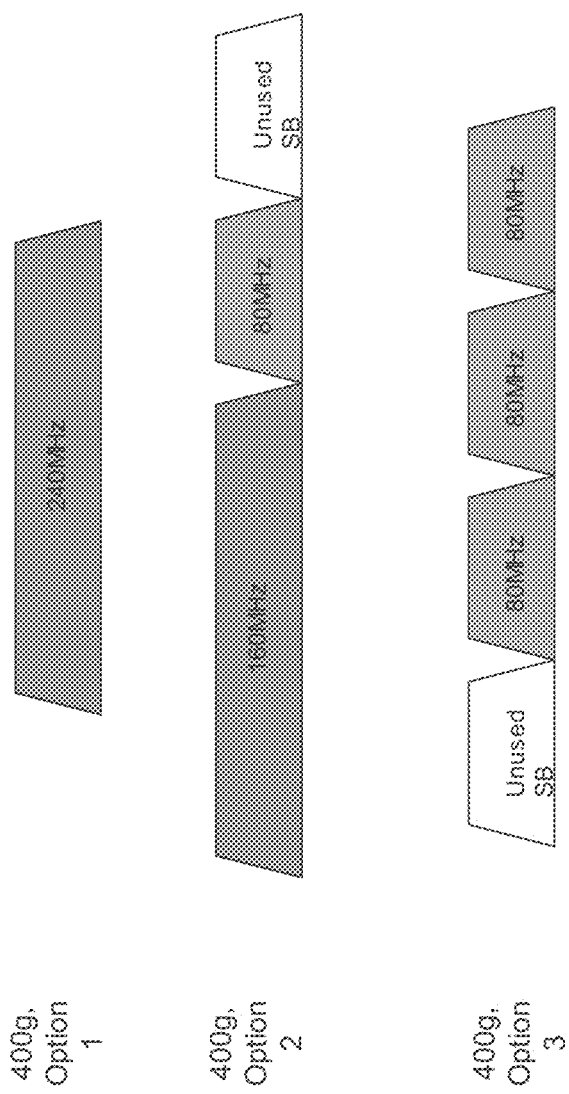

FIG. 4A is an illustration of different modes 400a-400g available for a 240 or 320 MHz transmission. As shown in FIG. 4A, the 240 or 320 MHz transmissions may be transmitted in at least nine different modes as shown in 400a-400g. Each of the modes 400a-400g may represent a different combination of channel bandwidth (BW) and frequency bands that may be used, depending on channel availability (for example, in 2.4, 5, and/or 6 GHz networks). In a first mode 400a, the 320 MHz transmission may be transmitted in a single, contiguous 320 MHz frequency band. In a second mode 400b, the 320 MHz transmission may be transmitted in two disjoint 160 MHz frequency bands, where each of the disjoint 160 MHz frequency bands are contiguous frequency bands. As shown, each of the frequency bands is separated by unused sub-bands (SBs). In a third mode 400c, the 320 MHz transmission may be transmitted in three disjoint frequency bands, where one of the disjoint frequency bands is a 160 MHz frequency contiguous frequency band and the other two disjoint frequency bands are 80 MHz frequency contiguous frequency bands. In this third mode 400c, while the 320 MHz transmission is shown with the 160 MHz frequency band first followed by the two 80 MHz frequency bands, this arrangement of 160 and 80 MHz frequency bands may be in any order. As shown, each of the frequency bands is separated by unused sub-bands (SBs). In a fourth mode 400d, the 320 MHz transmission may be transmitted in four disjoint frequency bands, where each of the disjoint frequency bands is an 80 MHz frequency contiguous frequency band. In a fifth mode 400e, a 240 MHz bandwidth may comprise a 160 MHz and an 80 MHz frequency band separated by an unused 80 MHz frequency band. In a sixth mode 400f, the 240 MHz bandwidth may comprise three 80 MHz frequency bands separated by unused 80 MHz frequency bands. In a seventh mode 400g, a 240 MHz transmission may be transmitted in a single, contiguous 240 MHz bandwidth. In a first option for the seventh mode 400g, the 240 MHz bandwidth may comprise a single, contiguous 240 MHz frequency band with a single unused 80 MHz frequency band either preceding or following the 240 MHz frequency band. In a second option for the seventh mode 400g, the 240 MHz bandwidth may comprise a single 160 MHz frequency band and a single 80 MHz frequency band that are adjacent to each other, thus forming the contiguous 240 MHz bandwidth. In some embodiments, the 160 MHz frequency band will precede the 80 MHz frequency band or vice versa. The 160 MHz and 80 MHz frequency bands may be preceded or followed by an unused 80 MHz frequency band. In a third option for the seventh mode 400g, the 240 MHz bandwidth may comprise three consecutive 80 MHz frequency bands, thus forming a contiguous 240 MHz bandwidth. The 80 MHz frequency bands may be preceded or followed by an unused 80 MHz frequency band. For any of the modes described herein, the unused SBs that separate the contiguous frequency bands may be of any BW or of different BWs. In some embodiments, tone plans may be designed, and signal generation may be completed for contiguous frequency band of 80 MHz, 160 MHz, and 320 MHz bandwidth sizes. In some embodiments, tone plans may be designed, and signal generation may be completed for a contiguous frequency band of 240 MHz bandwidth size.

Thus, each of the modes 400a-400g may have one or more options for creating the 320 MHz transmission. The mode 400a may include (1) a first option of having a single 320 MHz tone plan; (2) a second option of duplicating two 160 MHz tone plans, one in each of two PHY 160 MHz SBs and separated by an unused SB; and (3) a third option of duplicating four 80 MHz tone planes, one in each of four PHY 80 MHz SBs separated by unused SBs. The mode 400b may include (1) a first option of using two 160 MHz tone plans, each in one PHY 160 MHz SB and (2) a second option of duplicating four 80 MHz tone plans, one in each of four PHY 80 MHz SBs and separated by unused SBs. The mode 400c may include (1) a first option of having a single 160 MHz tone plan in one PHY 160 MHz SB and duplicating two 80 MHz tone plans in each of the remaining PHY 80 MHz SBs and (2) a second option of duplicating four 80 MHz tone plane, one in each of four PHY 80 MHz SBs separated by unused SBs. The mode 400d may include an option of duplicating four 80 MHz tone plans, one in each of four PHY 80 MHz SBs separated by unused SBs. The mode 400e may include a first option of using a 160 MHz tone plan for the 160 MHz frequency band and an 80 MHz tone plan for the 80 MHz frequency band. The mode 400e may include a second option of using four duplicate 80 MHz tone plans, one in each of the 80 MHz frequency bands. The mode 400f may duplicate three 80 MHz tone plans, each in one of the 80 MHz frequency bands. The mode 400g may include (1) a first option of using a single 240 MHz tone plan for the 240 MHz frequency band, (2) a second option of using a 160 MHz tone plan and an 80 MHz tone plan preceded or followed by unused SBs, and (3) a third option of using three 80 MHz tone plans preceded or followed by unused SBs. In some embodiments, options 2 and 3 for mode 400g may correspond to the tone plan proposals for modes 400e and 400f.

Based on these modes and options, different tone plans may be designed or generated for the 80, 160, 240, or 320 MHz BWs. Tone plan designs for 80 MHz, 160 MHz, and 320 MHz for 3 symbol duration options are the building blocks. In some embodiments, tone plan designs for 240 MHz for 3 symbol duration options may be included in the building blocks. In some embodiments, the different frequency bands may use different symbol durations. For example, for the second option of the 240 MHz frequency band, the 160 MHz frequency band may use a first symbol duration while the 80 MHz frequency band may use a second symbol duration different from the first symbol duration. In some embodiments, the tone plans for the 240 MHz bandwidth can be generated or designed based on the building blocks (e.g., the 80 and 160 MHz transmissions discussed herein).

FIG. 4B is an illustration of a table of a number of RUs available for each of a 20 MHz channel, a 40 MHz channel, an 80 MHz channel, an 80+80×2 MHz mode or a 160 MHz mode for a 160 MHz channel, and an 80×4 MHz mode, a 160+80×2 MHz mode, 160×2 MHz mode, or 320 MHz mode for a 320 MHz channel. The As shown in FIG. 4B, each transmission can be formed from a combination of one or more 26-, 52-, 106-, 242-, 484-, or 996-tone RUs. Generally, as shown in FIG. 4B, a channel BW of 20 MHz may include 9 26-tone RUs, 4 52-tone RUs, 2 106-tone RUs, and 1 242-tone RU. The 20 MHz channel BW may not be able to support the 484- or 996-tone RUs. A channel BW of 40 MHz may include 18 26-tone RUs, 8 52-tone RUs, 4 106-tone RUs, 2 242-tone RUs, and 1 484-tone RU. The 40 MHz channel BW may not be able to support the 996-tone RU. A channel BW of 80 MHz may include 37 26-tone RUs, 16 52-tone RUs, 8 106-tone RUs, 4 242-tone RUs, 2 484-tone RUs, and 1 996-tone RU. The 80 MHz channel BW may not be able to support the 2×996- or 4×996-tone RUs. A channel BW of 80+80×2 MHz or 160 MHz may include 74 26-tone RUs, 32 52-tone RUs, 16 106-tone RUs, 8 242-tone RUs, 4 484-tone RUs, 2 996-tone RUs, and 1 2×996-tone RU. The 80+80 MHz or 160 MHz channel BW may not be able to support the 4×996-tone RU. A channel BW of 80×4 MHz, 160+80×2 MHz, 160×2 MHz, or 320 MHz may include 148 26-tone RUs, 64 52-tone RUs, 32 106-tone RUs, 16 242-tone RUs, 8 484-tone RUs, 4 996-tone RUs, 2 2×996-tone RUs, and 1 4×996 tone RU.

The different modes described herein for the 240 or 320 MHz channel BW may be different options of symbol durations and tone spacings, depending on the mode being used.

FIGS. 5A-5B show example tone spacings and index ranges for different FFT sizes and symbol durations at each of 80, 160, and 320 MHz transmissions, according to one embodiment. Various 802.11 protocols may use 1× symbol durations (e.g., 802.11a to 802.11ac). The 1× symbol durations may have a tone spacing of 312.5 kHz. Other 802.11 protocols may use 4× symbol durations (e.g., 802.11ax). The 4× symbol durations may have a tone spacing of 78.125 kHz. Next generation 802.11 devices and standards may utilize either the 1× or 4× symbol durations or may introduce/utilize a 2× symbol duration of 6.4 µs having a tone spacing of 156.25 kHz. Specifically, FIG. 5A shows an FFT size for each option (e.g., combination of symbol duration and tone spacing). For example, the 80 MHz channel BW has 256 tones available at 1× symbol duration and 312.5 kHz spacing (option 1), 512 tones available at 2× symbol duration and 156.25 kHz spacing (option 2), and 1024 tones available at 4× symbol duration and 78.125 kHz spacing (option 3). The 160 MHz channel BW has 512 tones available at 1× symbol duration and 312.5 kHz spacing, 1024 tones available at 2× symbol duration and 156.25 kHz spacing, and 2048 tones available at 4× symbol duration and 78.125 kHz spacing. The 320 MHz channel BW has 1024 tones available at 1× symbol duration and 312.5 kHz spacing, 2048 tones available at 2× symbol duration and 156.25 kHz spacing, and 4096 tones available at 4× symbol duration and 78.125 kHz spacing. In some aspects, 1× and 2× symbol durations may have similar benefits as compared to a 4× symbol durations. In some aspects, 1× and 2× symbol durations may have lower complexity, latency, and memory requirements due to corresponding smaller FFT sizes as compared to the 4× symbol duration, which has a higher complexity, latency, and memory requirement due to its larger FFT size. The 1× and 2× symbol durations each have a lower tone plan and cyclic prefix (CP) or guard interval (GI) efficiency than the 4× symbol duration that has a higher tone plan and GI efficiency. Further, the 1× and 2× symbol durations may not have outdoor support while the 4× symbol duration may have outdoor support, although the 320 MHz bandwidth may be generally used indoors. The 1× and 2× symbol durations may need a new design to provide OFDMA support, as they cannot be mixed with high efficiency STAs in DL/UL OFDMA. However, the 4× symbol duration may provide OFDMA support, as it can be mixed with HE STAs in DL/UL OFDMA. When memory size is not being considered, then the 4× symbol duration may be a more natural choice for symbol duration. However, if maintaining memory size is the goal, then the 1× or 2× symbol duration may be considered. For 1× trigger based PPDU, the UL overhead of 50% in view of the 1.6 μs GI is too high, so the 2× symbol duration may be more likely a selection. In some embodiments, reduced symbol durations may advantageously result in reduced complexity and reduced memory utilization.

Accordingly, the index ranges of the tones for each of these options is shown in FIG. 5B, which shows that 256 tones have a range of [-128, 127], 512 tones have a range of [-256, 255], 1024 tones have a range of [-512, 511], 2048 tones have a range of [-1024, 1023], and 4096 tones have a range from [-2048, 2047].

FIG. 5C shows example tone plans that can be used with various FFT sizes and symbol durations at each of 80, 160, and 320 MHz transmissions, according to one embodiment. As shown in FIG. 5C, the option 1× symbol duration may provide for an 11ac 80 MHz tone plan (of 1× symbol duration), and alternatively, an 11ax 20 MHz tone plan (of 4× symbol duration) upclocked by 4 for the FFT size of 256 tones, an 11ac 160 MHz tone plan (of 1× symbol duration), and alternatively, an 11ax 40 MHz tone plan (of 4× symbol duration) upclocked by 4 for the 512 tone FFT size, and an 11ax 80 MHz tone plan (of 4× symbol duration) upclocked by 4, and alternatively, duplicate two 11ac 160 MHz tone plans (of 1× symbol duration) for the 1024 FFT size. The option 2, 2× symbol duration, may provide for an 11ac 160 MHz tone plan (of 1× symbol duration) downclocked by 2, and alternatively, an 11ax 40 MHz tone plan (of 4× symbol duration) upclocked by 2 for the FFT size of 512 tones, an 11ax 80 MHz tone plan (of 4× symbol duration) upclocked by 2 for the 1024 tone FFT size, and alternatively, an 11ax 160 MHz tone plan (of 4× symbol duration) upclocked by 2, and yet alternatively, new 2048-point tone plan designs for the 2048 FFT size. The option 3 4× symbol duration may provide for an 11ax 80 MHz tone plan (of 4× symbol duration) for the FFT size of 1024 tones, an 11ax 160 MHz tone plan (of 4× symbol duration), and alternatively, new 2048-point tone plan designs for the 2048 tone FFT size, and duplicate two 11ax 160 MHz tone plans (of 4× symbol duration), and alternatively, new 4096-point tone plan designs for the 4096 FFT size. Additional tone plans may exist that are not shown in FIG. 5C. 2048-point tone plans including the 11ax 160 MHz tone plan may include at least 12 left and 11 right guard tones. However, different 2048-point tone plans may be generated, where the different 2048-point tone plans only share at least 12 left and 11 right guard tones. For example, some 2048-point tone plans may include more than 12 left and more than 11 right guard tones. Accordingly, the 2048-point tone plan may have a 2025 core tone block (2048-12-11). The "2025 core tone block" concept is used herein for simplicity in figure depiction.

The options (e.g., the different symbol durations) may provide benefits and/or drawbacks for the various modes 400a-400g. For example, option 1 (the 1× symbol duration) may not support OFDMA (e.g., 802.11ac 1× symbol duration tone plans do not currently support OFDMA). While the 802.11ax 4× symbol duration tone plans of bandwidth of ¼ BW (which do support OFDMA) could be used as a 1× symbol duration tone plan for bandwidth of BW, such instances may require upclocking of hardware operation or capabilities by a factor of 4, which may increase costs and/or complexity of hardware. For example, an 11ax 20 MHz tone plan (of 4× symbol duration) upclocked by 4 may be used as the 1× symbol duration 80 MHz tone plan. Accordingly, the option 1 may not be a desirable option. Option 2 (the 2× symbol duration) may be developed but may not have any legacy support, since generally 802.11 networks do not currently utilize 2× symbol durations in data portion. 1× symbol duration tone plans may not be useful, as they may not support OFDMA, meaning that downclocking the 1× symbol duration tone plans to make it work for 2× symbol duration may not be a desirable option. Similar to option 1, the 4× symbol duration tone plans of bandwidth of ½ BW, which do support OFDMA, could be used as a 2× symbol duration tone plan for bandwidth of BW, but may still require an upclocking of the hardware by a factor of 2, which may still increase costs and/or complexity of the hardware. For example, an 11ax 40 MHz tone plan (of 4× symbol duration) upclocked by 2 may be used as the 2× symbol duration 80 MHz tone plan. Option 3 (e.g., the 4× symbol duration) may use 80 and 160 MHz 4× symbol duration tone plans (which support OFDMA) or may utilize new tone plans designed specifically for the 160 MHz or 320 MHz BWs. However, the 4× symbol durations for 320 MHz may increase the FFT size, which may increase complexity and latency of the hardware. Lower symbol durations may enable smaller FFT sizes that decrease complexity and latency of the hardware.

The various tone plans shown and described in relation to FIG. 5C may include different configurations of guard and direct current (DC) tones. For example, the 80 MHz tone plan may utilize 6 left and 5 right guard tones and 3 DC tones in a 1× symbol duration tone plan. The 20 MHz tone plans in a 4× symbol duration may use at least 6 left and 5 right guard tones. The 40 and 80 MHz tone plans in the 4× symbol duration may use at most 12 left and 11 right guard tones. The 20, 40, and 80 MHz tone plans in the 4× symbol duration may use at least 3 DC tones (20 MHz tone plans) and at most 5 DC tones (40 and 80 MHz tone plans) for single user (SU) communications and 5 or 7 DC tones for multiuser OFDMA. Hence, the 2× symbol duration may utilize at least 12 left and 11 guard tones and 5 or 7 DC tones for the 2048- and 4096-point tone plans. In some cases, tone plans for SU communications may also be used for non-OFDMA communications such as multiuser MIMO communications.

Overview

The 2048-point tone plan described here may be used as a 4×160 MHz tone plan or a 2×320 MHz tone plan. The 2048-point tone plan described herein (e.g., in relation to FIG. 5C) may utilize at least 12 left and 11 right guard tones and 5 DC tones for single user communications. Such a configuration may provide for up to 2020 data and pilot tones in the 2048-point tone plan. For multiuser OFDMA, the 2048-point tone plan may be configured to utilize at least 12 left and 11 right guard tones and 7 DC tones, providing up to 2018 data and pilot tones in the 2048-point tone plan. The 4096-point tone plan described herein (e.g., in relation to FIG. 5C) may utilize at least 12 left and 11 right guard tones and 5 DC tones for single user communications. Such a configuration may provide for up to 4068 data and pilot tones in the 4096-point tone plan. For multiuser OFDMA, the 4096-point tone plan may be configured to utilize at least 12 left and 11 right guard tones and 7 DC tones, providing up to 4066 data and pilot tones in the 4096-point tone plan.

If a single radio frequency filter is utilized for either the 160 or 320 MHz BWs, additional guard tones may be utilized (e.g., in addition to the 12 left or 11 right described herein) for the respective tone plans.

The 2048-point tone plan may utilize various configurations that each provides different benefits and drawbacks. For example, in a first configuration, the 160 MHz tone plan may duplicate two 80 MHz tone plans. In such a configuration, the total 160 MHz tone plan may have an efficiency matching the 80 MHz tone plans because, due to the duplicated 80 MHz tone plans, the number of guard tones for the entire 160 MHz tone plan is doubled (i.e., one set of guard tones for each 80 MHz tone plan) and the sub-band DC tones may be wasted because they do not carry data or pilots (e.g., they are not data tones or pilot tones). In this first configuration, the guard band size for the 160 MHz tone plan may be the same as the guard band for the 80 MHz tone plan. This means the guard band may need to be increased if radio front end uses a radio frequency (RF) filter designed for a larger bandwidth, e.g., 160 or 320 MHz.

In a second configuration, a single user use case may utilize 12 left and 11 right guard tones and 5 DC tones. Such a simplistic design for the 2048-point tone plan may allocate up to 2020 populated tones (e.g., data and pilot tones) for communication. In the single user use case, approximately 32 pilot tones (e.g., 16×2) may leave up to 1988 data tones for communication. The remaining tones may be additional DC tones or null tones. With 1988 data tones, factors of the data tones are 1, 2, 4, 7, 14, 28, 71, 142, 284, 497, 994, and 1988. The single user second configuration may also provide for a low-density parity check (LDPC) tone mapper distance of 14, 28, or 71 and may provide for use of a 1:1 frequency segment parser. In some embodiments, a newly defined RU may be generated, where the newly defined RU has a total number of populated tones for single user communication (e.g., 1988+32=2020).

In the second configuration, an OFDMA (i.e., multiuser) use case may shift all RUs in the lower half towards the left (lower frequency), and shift all RUs in the upper half towards the right (higher frequency). By doing so, 5 sub-band DC tones (essentially null tones) in the middle of each 512-point half tone plan may be eliminated, leaving only 7 DC tones in the center of the index of the 2048-point tone plan (e.g., [−3, 3]), instead of the original 23 DC tones in the center. For example, when the RUs are 996-tone RUs, the 996-tone RUs may have indices of [−1012, −17], [17, 1012]). In addition to the 7 DC tones in the center of the index, 26 tones may be added to the center of the tone plan at [−16, −4] and [4, 16]. These 26 tones come from the original 23 DC tones in the center and the 2 times 5 sub-band DC tones in each 512-point half tone plan minus the new 7 DC tones arranged from [−3, 3] (23+2×5−7=26). As described herein, the second configuration (e.g., as shown in FIG. 6D herein and further described below) may provide improved efficiencies over at least the first configuration.

In the third configuration, larger guard bands are created at the edges of the tone plan. For example, the RUs may be shifted toward the center of the tone plan. The center of the tone plan may have 23 DC or null tones (e.g., 12+11) that reduce to y DC tones. The number y of DC tones may be odd and may be greater than or equal to 5 and less than or equal to 23 (i.e., $5 \leq y \leq 23$) such that there are (23−y)/2 more guard tones on either side of the tone plan. As described herein, the third configuration (e.g., as shown in FIG. 6E herein and further described below) may provide improved efficiencies over at least the first configuration. For example, if y=7 DC tones, there would be (23−y)/2=8 additional guard tones per side, yielding 20 left and 19 right guard tones in the 2048-point tone plan.

The 4096-point tone plan described here may be used as a 4×320 MHz tone plan. The 4096-point tone plan may utilize various configurations that each provides different benefits and drawbacks. For example, in a first configuration (e.g., as shown in FIG. 6F herein and further described below), the 320 MHz tone plan may be formed from duplicate tone plans. A first alternative of the first configuration may comprise duplicate two 160 MHz tone plans. A second alternative of the first configuration may comprise four duplicated 80 MHz tone plans (1024-point tone plans) to form the 320 MHz tone plan (4096-point tone plan).

In a second configuration, a single user use case may utilize 12 left and 11 right guard tones and 5 DC tones. Such a simplistic design for the 4096-point tone plan may allocate up to 4068 populated tones (e.g., data and pilot tones) for communication. In the single user use case, approximately 64 pilot tones (e.g., 16×4) may leave up to 4004 data tones for communication. The remaining tones may be additional DC tones or null tones. With 4004 data tones, factors of the data tones are 1, 2, 4, 7, 11, 13, 14, 22, 26, 28, 44, 52, 77, 91, 143, 154, 182, 286, 308, 364, 572, 1001, 2002, and 4004. The single user second configuration may also provide for a low-density parity check (LDPC) tone mapper distance of 14, 22, 26, 28, 44, 52, or 77 and may provide for use of a 1:1 frequency segment parser. With 4000 data tones, factors of the data tones are 1, 2, 4, 5, 8, 10, 16, 20, 25, 32, 40, 50, 80, 100, 125, 160, 200, 250, 400, 500, 800, 1000, 2000, and 4000. The single user second configuration may also provide for a low-density parity check (LDPC) tone mapper distance of 16, 20, 25, 32, 40, 50, or 80 and may provide for use of a 1:1 frequency segment parser.

In the second configuration, an OFDMA (i.e., multiuser) use case may duplicate two 2048-point tone plans in each half of the 4096-point tone plan. Each 2048-point half may have at least 5 to 7 tones that are null tones (e.g., unpopulated tones). In the center of the 4096-point tone plan, there are 23 unpopulated tones (e.g., 12+11 tones). All RUs in the lower half are shifted towards left (lower frequency) and all RUs in the upper half are shifted towards right (higher frequency). By doing so, 5 sub-band DC tones in the middle of each 2048-point half tone plan may be eliminated, and leaving only 7 DC tones in the center of the index of the 4096-point tone plan (e.g., [−3, 3]), instead of the original 23 DC tones in the center. For example, when the RUs are 2020-tone RUs, the 2020-tone RUs may have indices of [−2036, −17], [17, 2036]). 26 tones (12+11+5+5−7 tones) may be added to the center of the tone plan at [−16, −4] and [4, 16]. As described herein, the second configuration (e.g., as shown in FIG. 6G herein and further described below) may provide improved efficiencies over at least the first configuration of the 4096-point tone plan.

In the third configuration of the 4096-point tone plan, larger guard bands are created at the edges of the tone plan. This third configuration of the 4096-point tone plan may be based on duplication of two 160 MHz tone plans for four 80 MHz tone plans. For example, the RUs may be shifted toward the center of the tone plan to reduce to z the DC tones at the center of the tone plan. The number z of DC tones may be odd and may be greater than or equal to 5 and less than or equal to 23 (i.e., 5≤z≤23) such that there are (23−z)/2 more guard tones on either side of the tone plan. As described herein, the third configuration (e.g., as shown in FIG. 6H herein) may provide improved efficiencies over at least the first configuration. For example, if z=7 DC tones, there would be (23−z)/2=8 additional guard tones per side, yielding at least 20 left and 19 right guard tones in the 4096-point tone plan.

The 80 MHz 4× symbol duration tone plan for disjoint 80 MHz SBs may be based on 802.11ax 80 MHz single user and/or OFDMA tone plans. The 160 MHz 4× symbol duration tone plan for contiguous 160 MHz SBs that are disjoint from other SBs may use the 802.11ax single user or OFDMA 160 MHz tone plan (Option 1). Alternatively (Option 2), the single user or OFDMA expaned guard band tone plans as described herein in relation to FIG. 6E may be used.

The 320 MHz 4× symbol duration one plan for contiguous 320 MHz SBs may use one of various options. As a first option, two 160 MHz 4× symbol duration single user or OFDMA tone plans are duplicated in each 160 MHz SB of the 320 MHz SB. In such an option (Option 1a), four 802.11ax 80 MHz 4× symbol duration single user or OFDMA tone plans are duplicated in each 80 MHz SB of the 320 MHz SB. Alternatively (Option 1b), in such an option, two 160 MHz single user or OFDMA tone plans with expanded guard bands at the left and right edge may be duplicated in each 160 MHz SB of the 320 MHz SB with reduced DC tones at the center of the tone plan (e.g., reduced to y DC tones). As a second option, single or OFDMA tone plans with expanded left and right edge guard bands may be implemented. In such an option (Option 2a), four 802.11ax 80 MHz 4× symbol duration single user or OFDMA tone plans may be duplicated in each 80 MHz SB of the 320 MHz SB with reduced DC tones at the center of the tone plan (e.g., reduced to z DC tones) or, alternatively (Option 2b), two 160 MHz single user or OFDMA tone plans with expanded guard bands at the left and right edge may be duplicated in each 160 MHz SB of the 320 MHz SB with reduced DC tones at the center of the tone plan (e.g., reduced to z DC tones).

FIGS. 6A-6H show example 20 MHz, 40 MHz, 80 MHz, 160 MHz, and 320 MHz transmissions using 26-, 52-, 106-, 242-, 484-, 996- and/or other tone allocations, according to various embodiments.

Certain Embodiments

In particular, FIG. 6A shows example 20 MHz transmissions 600A, having 6 left edge tones, 7 DC tones, and 5 right edge tones, and a total of 238 usable tones for OFDMA or 242 usable tones for a single user. Although FIG. 6A shows four example transmissions 600A using various combinations of 26-, 52-, 106-, and 242-tone blocks, allocations within any given transmission can include multiple tone blocks of different sizes, having different arrangements, in various embodiments.

FIG. 6B shows example 40 MHz transmissions 600B, having 12 left edge tones, 5 DC tones, and 11 right edge tones, and a total of 484 usable tones. Although FIG. 6B shows four example transmissions 600B using various combinations of 26-, 52-, 106-, and 242-tone blocks, allocations within any given transmission can include multiple tone blocks of different sizes, having different arrangements, in various embodiments. In the illustrated embodiment, each 40 MHz transmission 600B is a duplicate of two 20 MHz transmissions 650B, which in various embodiments can be the 20 MHz transmissions 600A of FIG. 6A or any other 20 MHz transmission discussed herein.

Figure 6C:
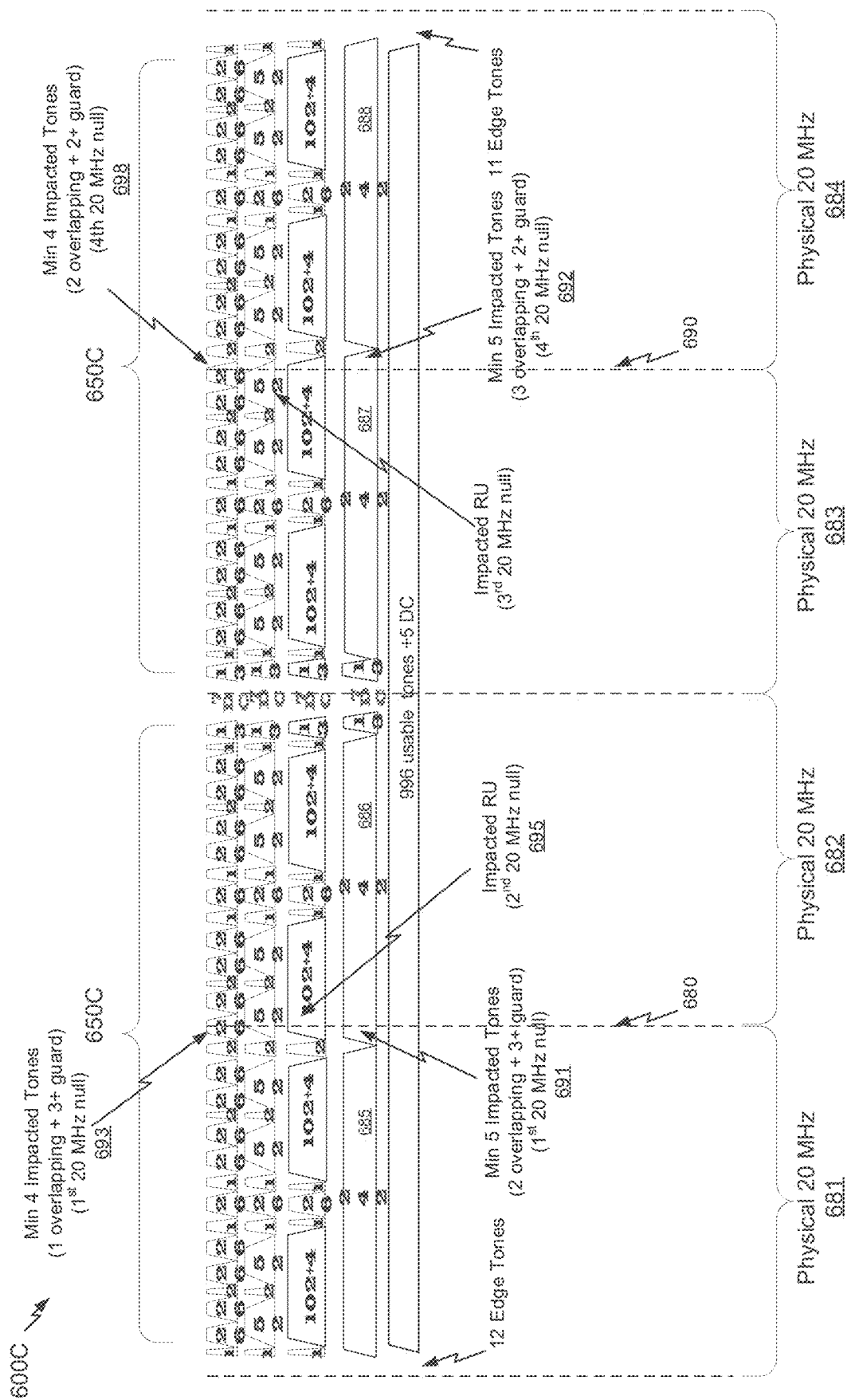
Figure 6D:
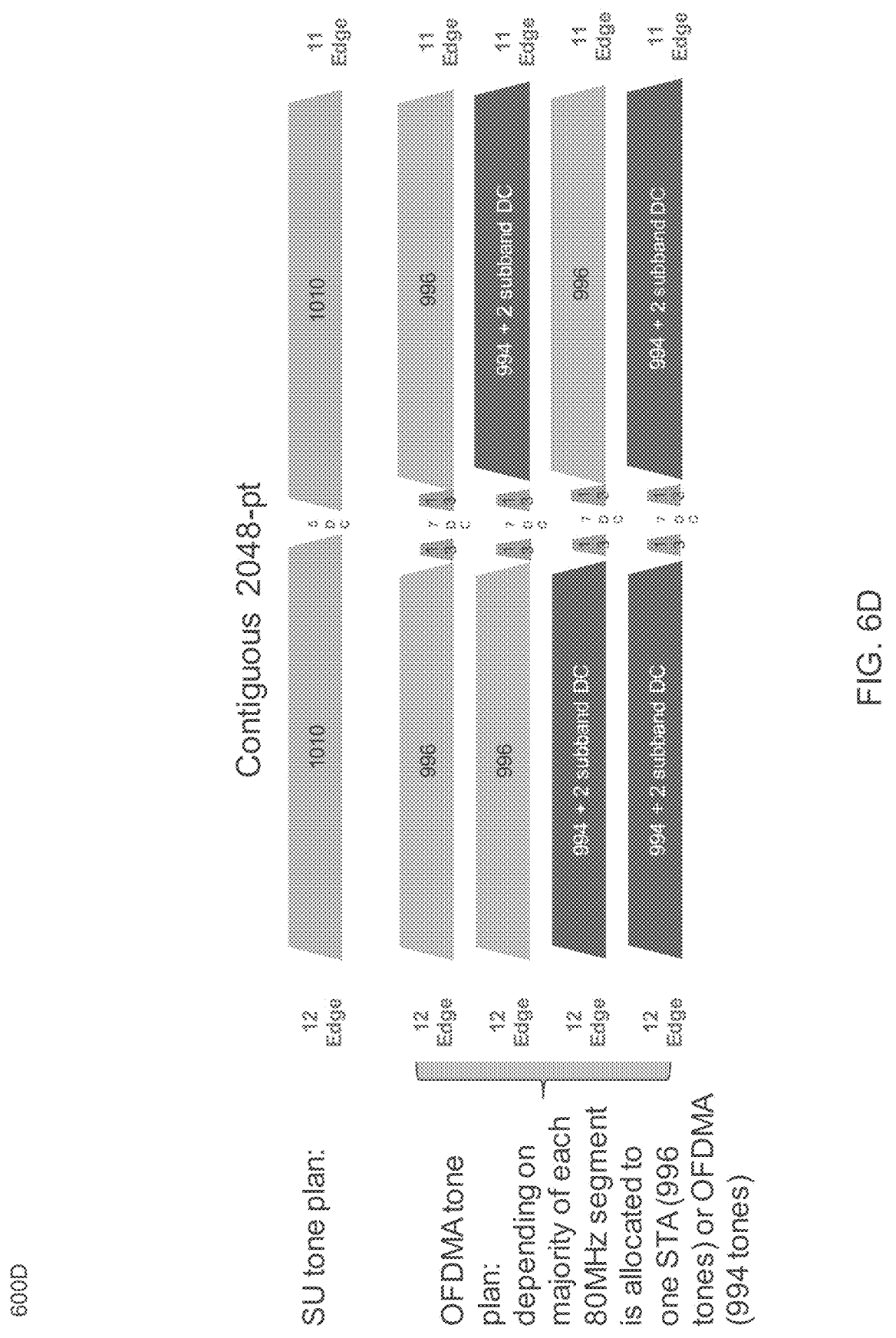
Figure 6E:
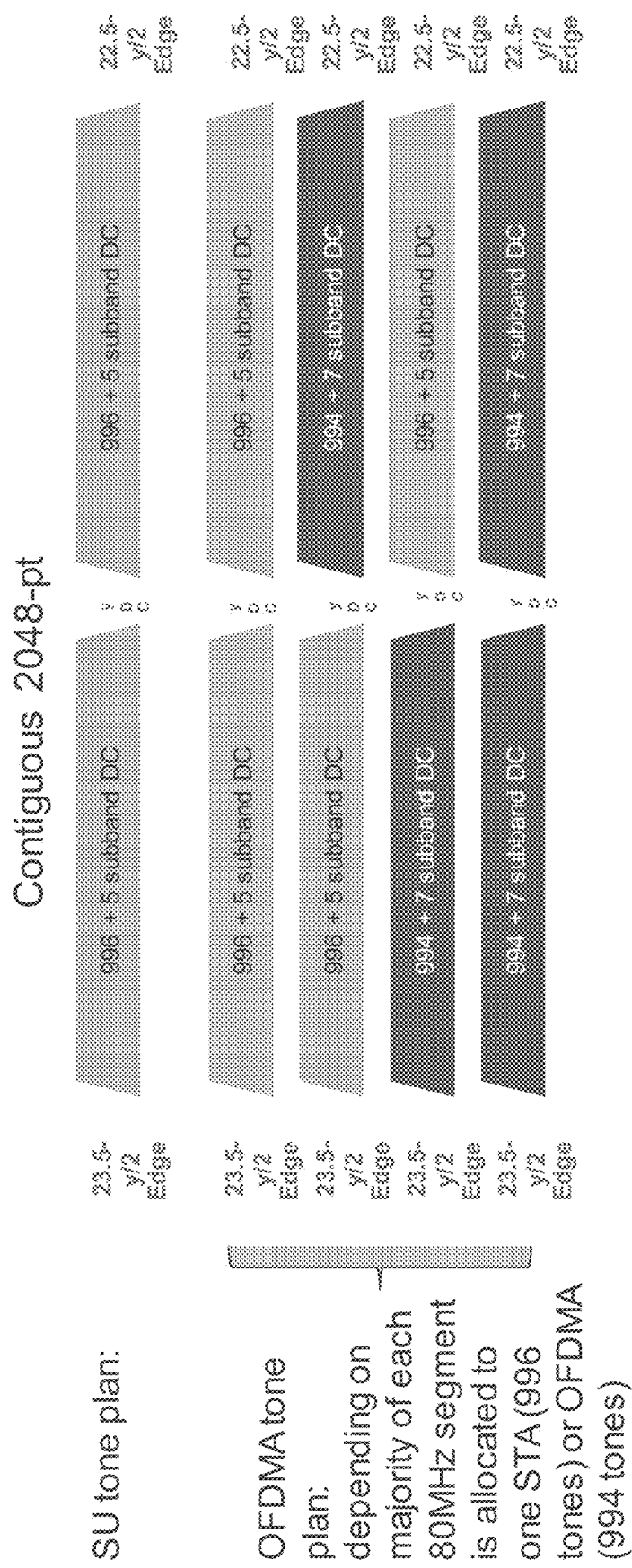
Figure 6F:
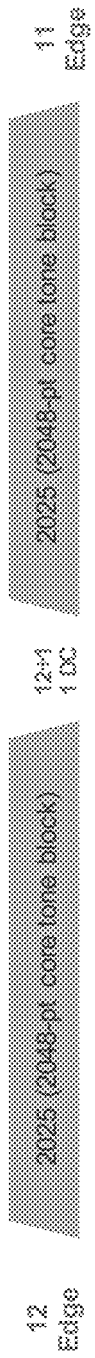
Figure 6G:
Figure 6H:

FIG. 6C shows example 80 MHz transmissions 600C having 12 left edge tones, 7 DC tones, and 11 right edge tones, and a total of 994 usable tones for OFDMA, and a total of 996 usable tones for whole bandwidth (BW) allocation with reduced number of DC tones being 5. Although FIG. 6C shows five example transmissions 600C using various combinations of 26-, 52-, 106-, 242-, and 996-tone blocks, allocations within any given transmission can include multiple tone blocks of different sizes, having different arrangements, in various embodiments.

The fifth of the illustrated transmissions 600C includes a single-user tone plan having 5 DC tones in various embodiments. Accordingly, the SU tone plan can include 996 usable tones.

FIG. 6D shows example 2048-point tone plans for both single user and OFDMA applications. As described herein, the single user tone plan for the 2048-point tone plan may include the 12 left edge guard tones, 5 DC tones in the center, and a 2020-tone RU where every 1010 tones are in each half, and the 11 right edge guard tones. The OFDMA application may provide at least four variations for the contiguous 2048-point tone plan. In the first variation, the 2048-point tone plan includes the 12 left edge or guard tones, a 996-tone RU, 13 tones (e.g., a first part of a center 26-tone RU split) between the 996-tone RU and the 7 DC tones, 13 tones (e.g., a second part of the center 26-tone RU split), a second 996-tone RU, and the 11 right edge or guard tones. In the second variation, the 2048-point tone plan includes the 12 left edge or guard tones, a 996-tone RU, 13 tones (e.g., a first part of a center 26-tone RU split) between the 996-tone RU and the 7 DC tones, 13 tones (e.g., a second part of the center 26-tone RU split), a 994-tone block for OFDMA RUs with additional 2 DC tones, and the 11 right edge or guard tones. In the third variation, the 2048-point tone plan includes the 12 left edge or guard tones, a 994-tone block for OFDMA RUs with additional 2 sub-band DC tones, 13 tones (e.g., a first part of a center 26-tone RU split), the 7 DC tones, 13 tones (e.g., a second part of the center 26-tone RU split), a 996-tone RU, and the 11 right edge or guard tones. In the fourth variation, the 2048-point tone plan includes the 12 left edge or guard tones, a 994-tone block for OFDMA RUs with additional 2 DC tones, 13 tones (e.g., a first part of a center 26-tone RU split), the 7 DC tones, 13 tones (e.g., a second part of the center 26-tone RU split), a 994-tone block for OFDMA RUs with additional sub-band 2 DC tones, and the 11 right edge or guard tones.

FIG. 6E shows example 2048-point tone plans for both single user and OFDMA applications. As described herein, the single user tone plan for the 2048-point tone plan of FIG.

6E may include a larger guard band at the edges of the 2048-point tone plans as compared to the 2048-tone plans of FIG. 6D. For example, for the single user application of the 2048-point tone plan with expanded guard bands, the left edge guard band may have a size of (23.5−y)/2 tones, a first RU with 996 tones and 5 sub-band DC tones, y DC tones in the center of the 2048-point tone plan, a second RU with 996 tones and 5 sub-band DC tones, and a right edge guard band of (22.5−y)/2 tones. The OFDMA application may provide at least four variations for the contiguous 2048-point tone plan with expanded guard bands. In the first variation, the 2048-point tone plan includes the (23.5−y)/2 left edge guard band, a first RU with 996 tones and 5 sub-band DC tones, y DC tones in the center of the 2048-point tone plan, a second RU with 996 tones and 5 sub-band DC tones, and a right edge guard band of (22.5−y)/2 tones. In the second variation, the 2048-point tone plan includes the (23.5−y)/2 left edge guard band, an RU with 996 tones and 5 sub-band DC tones, y DC tones in the center of the 2048-point tone plan, a RU with 994 tones and 7 sub-band DC tones, and a right edge guard band of (22.5−y)/2 tones. In the third variation, the 2048-point tone plan includes the (23.5−y)/2 left edge guard band, an RU with 994 tones and 7 sub-band DC tones, y DC tones in the center of the 2048-point tone plan, an RU with 996 tones and 5 sub-band DC tones, and a right edge guard band of (22.5−y)/2 tones. In the fourth variation, the 2048-point tone plan includes the (23.5−y)/2 left edge guard band, a first RU with 994 tones and 7 DC tones, y DC tones in the center of the 2048-point tone plan, a second RU with 994 tones and 7 DC tones, and a right edge guard band of (22.5−y)/2 tones. In some embodiments, the single user or the OFDM tone plan may depend on a majority of each 80 MHz segment being allocated to a single STA (e.g., the 996-tone RU) or OFDMA (e.g., the 994-tone block).

FIG. 6F shows an example 4096-point tone plan. As described herein, the contiguous 320 MHz, 4096-point tone plan of FIG. 6F may include 12 left edge guard tones, a first 2025-point core tone block, 12+11 DC tones in the center of the tone plan, a second 2025-point core tone block, and 11 right edge guard tones. The shown 4096-point tone play may apply for both single user and OFDMA communications. Note that the detailed tone plan design in the 2025-point core tone block depends on the 2048-point tone plan design.

FIG. 6G shows another example 4096-point tone plan. As described herein, the contiguous 320 MHz, 4096-point tone plan of FIG. 6G may include 12 left edge guard tones, a first 2025-point core tone block with 5 middle unpopulated tones removed (which essentially becomes a 2020-point tone block), 13 tones (first half of the center 26-tone RU split), 7 DC tones in the center of the tone plan, 13 tones (second half of the center 26-tone RU split), a second 2025-point core tone block with 5 middle unpopulated tones removed (which essentially becomes a 2020-point tone block), and 11 right edge guard tones. The shown 4096-point tone play may apply for both single user and OFDMA communications, depending on the detailed tone plan in the 2025-point core tone block.

FIG. 6H shows another example 4096-point tone plan. As described herein, the contiguous 320 MHz, 4096-point tone plan of FIG. 6H may have expanded guard bands that may include (23.5−z)/2 left edge guard tones, a first 2025-point core tone block, z DC tones in the center of the tone plan, a second 2025-point core tone block, and (22−5−z)/2 right edge guard tones. The shown 4096-point tone play may apply for both single user and OFDMA communications.

Non-Contiguous and Fractional Bandwidth

As discussed above, the AP 104 can allocate one or more RUs to each STA 106A-106D. In some embodiments, such allocations can be contiguous within the bandwidth of each transmission. In other embodiments, the allocations can be non-contiguous. In some embodiments, one or more sub-bands (SBs) can be selected for, or determined to contain, interfering wireless transmissions. Such SBs can be referred to as null sub-bands, and can contain one or more unallocated RUs.

Although various transmissions can be referred to herein as sub-bands, a person having ordinary skill in the art will appreciate, that in some embodiments, sub-bands can be referred to as bands or channels. As used herein, "BSS BW" can refer to bandwidth setup for use in a particular BSS, for example an entire channel. "PPDU BW" can refer to bandwidth of a particular PPDU being transmitted. For example, the AP 104 (FIG. 1) can set up a BSS having 80 MHz BSS BW. Within the 80 MHz BSS BW, STAs 106A-106D can transmit on 20+40 MHz allocations due to interference in the null SB of the secondary channel. Thus, for FDMA packets, PPDU BW of a first packet can be 20 MHz, and PPDU BW of a second packet can be 40 MHz. For OFDMA packets, PPDU BW of a single packet can be 20+40 MHz. Although PPDU BW are discussed herein in terms of 20, 40, and 80 MHz allocations, a person of ordinary skill in the art would appreciate that the features described herein can be applied to BWs of other sizes and/or alignments.

Determination of Impacted RUs

Fractional or non-contiguous channel allocation is available in a variety of BSS BWs including 80, 160, 80+80 MHz, 320 MHz, 160+160 MHz (or 2×160 MHz), 160+80+80 MHz (or 160+2×80 MHz), or 80+80+80+80 MHz (or 4×80 MHz). The entire PPDU BW tone plan may not be suitable in the channel bonding cases discussed above. For example, null SBs may not be aligned to physical 20 MHz boundaries and RU boundaries in unmodified tone plans can result in insufficient inter-channel interference mitigation.

Referring back to FIG. 6C, a plurality of physical 20 MHz SBs 681-684 and associated boundaries are shown. Although the illustrated transmission 600C is an 80 MHz transmission, the teachings herein can also be applied to 40 MHz transmissions, 160 MHz transmissions, 80+80 MHz transmissions (which, for example, can include two duplicated 80 MHz transmissions), 160+160 MHz transmissions, 320 MHz transmissions, 4×80 MHz transmissions (which, for example, can include two duplicated 160 MHz transmissions).

As shown in FIG. 6C, the first 242-tone block 685 is shifted 2 tones away from a boundary 680 of a first physical 20 MHz SB 681. The second 242-tone block 686 includes 2 tones crossing the 20 MHz boundary 680. Accordingly, in embodiments where the first physical 20 MHz SB 681 is a null SB and 3 additional left guard tones are specified, the 2 overlapping tones, plus 3 left guard tones equals 5 total tones 691, which can be referred to as impacted tones. Such impacted tones can overlap with a null SB, or a guard band thereof. Similarly, because the second 242-tone block 686 includes impacted tones, it can be referred to as an impacted RU. Moreover, where the second 20 MHz SB 682 is a null SB, the entire second 242-tone block 686 can be impacted (240 overlapping tones, plus 2 right edge tones).

The 7 DC tones can be split into 3+4 tones across a 20 MHz boundary and can serve as guard bands to the 20 MHz boundary in some embodiments. The third 242-tone block 687 includes 3 tones crossing a 20 MHz boundary 690, so assuming 2 right guard tones there are a total of 5 impacted tones 692 when the fourth physical 20 MHz SB 684 is null.

The fourth 242-tone block 688 is 3 tones away from the 20 MHz boundary 690. Although the foregoing description refers to the 242-tone blocks 685-689, the 26-, 56-, and 106-tone blocks can be impacted in the same way (and different tones of the same RU can be impacted with respect to different PHY 20 MHz SBs). For example, the 106-tone block 695 (and others) can include at least 4 impacted tones 693 with respect to the first physical 20 MHz SB 681 and all tones can be impacted with respect to the second physical 20 MHz SB 682, and so forth. Moreover, in embodiments where the number of guard tones is lower or higher, greater or fewer total tones can be impacted, respectively.

Considerations on Independent Encoding and Interleaving

As long as multiple RUs are assigned to one user, independent encoding and interleaving within each RU may be used. Alternatively, joint encoding of all information may be performed before parsing the information into different RUs using a parser. Accordingly, independent interleaving in each RU may be used. Alternatively, joint encoding and interleaving across all tones in the assigned RUs may be used.

Independent PPDUs For Non-Contiguous Channels

FIG. 7 shows an example of RU subcarrier indices, according to one embodiment. The RU subcarrier indices as shown in FIG. 7 may correspond to the 160 MHz and 320 MHz 4× symbol duration tone plans described herein (also labeled in reference to Options 1, 2, 1a, 1b, 2a, and 2b). For example, the 160 MHz tone plan described in relation to Option 1 may have RU sizes of 26, 52, 106, 242, 484, and 996 tones. The subcarrier indices in the lower 80 MHz SB may be reduced by 512 while the subcarrier indices in the upper 80 MHz SB may be increased by 512. For example, the 80 MHz tone plan may use an index range of [−512,511] and may have 1024-point. The 160 MHz tone plan may duplicate two 80 MHz tone plans. Thus, the lower half of the 160 MHz tone play may use an index range of [−1024, −1], which comes from the 80 MHz tone plan index range minus 512 (e.g., [−512,511]−512=[−1024, −1]. The upper half may use a range of [0,1024], which comes from the 80 MHz tone plan index range plus 512 (e.g., [−512,511]+512=[0, 1023]. By referring to how the indices are related, the RU boundaries, null tones, pilot tones, etc. in 160 MHz, may be described based on or in reference to the 80 MHz. The 160 MHz tone plan described in relation to Option 2 may also have RU sizes of 26, 52, 106, 242, 484, and 996 tones. The subcarrier indices in the lower 80 MHz SB may be reduced by 500.5+y/2 while the subcarrier indices in the upper 80 MHz SB may be increased by 500.5+y/2, where y is odd and greater than or equal to 5 and less than or equal to 23. Thus, instead of adding and subtracting 512 from the 80 MHz tone plan index range, the value 500.5+y/2 is added or subtracted from the 80 MHz tone plan index range to obtain the subcarrier indices for RU boundaries, null tones, and pilot tones, etc. in the lower and upper 80 MHz SB, respectively.

The 320 MHz tone plan described in relation to Option 1a may also have RU sizes of 26, 52, 106, 242, 484, and 996 tones. The subcarrier indices in the lowest 80 MHz SB may be reduced by 1536 while the subcarrier indices in the second lowest 80 MHz SB are reduced by 512. The subcarrier indices in the second highest 80 MHz SB may be increased by 512, while the subcarrier indices of the highest 80 MHz SB may be increased by 1536. The 320 MHz tone plan described in relation to Option 1b may also have RU sizes of 26, 52, 106, 242, 484, and 996 tones. The subcarrier indices in the lowest 80 MHz SB may be reduced by 1524.5+y/2 while the subcarrier indices in the second lowest 80 MHz SB are reduced by 523.5−y/2. The subcarrier indices in the second highest 80 MHz SB may be increased by 523.5−y/2, while the subcarrier indices of the highest 80 MHz SB may be increased by 1524.5+y/2, where y is odd and greater than or equal to 5 and less than or equal to 23. Accordingly, Option 1b may be duplicating two 160 MHz tone plans to form a 320 MHz tone plan.

The 320 MHz tone plan described in relation to Option 2a may also have RU sizes of 26, 52, 106, 242, 484, and 996 tones. The subcarrier indices in the lowest 80 MHz SB may be reduced by 1524.5+z/2 while the subcarrier indices in the second lowest 80 MHz SB are reduced by 500.5+z/2. The subcarrier indices in the second highest 80 MHz SB may be increased by 500.5+z/2, while the subcarrier indices of the highest 80 MHz SB may be increased by 1524.5+z/2, where z is odd and greater than or equal to 5 and less than or equal to 23. Option 2a may be based on Option 1a with the DC tones shrunk to z tones. The 320 MHz tone plan described in relation to Option 2b may also have RU sizes of 26, 52, 106, 242, 484, and 996 tones. The subcarrier indices in the lowest 80 MHz SB may be reduced by 1513+y/2+z/2 while the subcarrier indices in the second lowest 80 MHz SB are reduced by 512−y/2+z/2. The subcarrier indices in the second highest 80 MHz SB may be increased by 512−y/2+z/2, while the subcarrier indices of the highest 80 MHz SB may be increased by 1513+y/2+z/2, where y and z are both odd and greater than or equal to 5 and less than or equal to 23.

In some embodiments, the 4× symbol duration tone plans for the 320 MHz BW may have various minimum sized RUs. For example, the minimum size RU could be 26-tones, meaning that the 4096-pt tone plan for the 320 MHz BW may include 148 26-tone RUs. When the minimum size RU is 52-tones, 64 52-tone RUs may be included in the 320 MHz BW. However, the overhead associated with such small RUs may create inefficiencies in the 320 MHz BW that outweigh any benefit provided. In some embodiments, the minimum RU size may be restricted to be at least 52-tones or 106-tones.

In some embodiments, when the minimum RU size is limited to 52-tones, shifting the RUs to align the RU boundaries within PHY SB boundaries alignment may not be performed in relation to 26-tone RUs (e.g., in each 80 MHz SB). Given room of at least 26 tones, by shifting RUs, RU boundaries may be aligned within PHY sub-band (e.g., 20 MHz) boundaries. When all RUs are 242-tone RUs, there may be 26-tones room. When smaller RUs are used (e.g., 106-tone RUs), more room may be available.

In some embodiments, preamble puncturing, as described herein, may be implemented. For example, for each PHY 20 MHz SB, 3 left and 2 right guard tones may be used for adjacent channel rejection. Thus, RUs in the first and fourth PHY 20 MHz SBs are inside of the PHY 20 MHz boundaries with 12 left+2 right and 3 left+11 right guard tones. RUs in the second PHY 20 MHz may have 2 tones eating into the first PHY 20 MHz and RUs in the third PHY 20 MHz may have 3 tones eating into the fourth PHY 20 MHz.

In some embodiments, where the minimum RU size is 52-tones, 26-tone RUs may be unused. Accordingly, the 160 MHz tone plan described in relation to Option 1 and the 320 MHz tone plan described in relation to Option 1a may be modified according to the 80 MHz SB tone plan for boundary alignment. In such a modification, RUs, null tones, data tones, and pilot tones in the first and fourth PHY 20 MHz SBs may not need to be adjusted or moved. The RUs, null tones, data tones, and pilot tones in the second PHY 20 MHz may be shifted to the right by A tones, where A is greater than or equal to 5 and less than or equal to 13 (i.e., subcarrier indices+A). The RUs, null tones, data tones, and pilot tones in the third PHY 20 MHz may be shifted to the left by A tones, where A is greater than or equal to 5 and less than or equal to 13 (i.e., subcarrier indices−A).

FIG. 8A shows an example modification of an 80 MHz SB tone plan 800a to an 80 MHz SB tone plan 800b for boundary alignment, according to one embodiment. In the 80 MHz SB tone plans shown, blank 26-tone RUs and the center 26-tone RU split (e.g., the two 13-tone blocks on either side of the DC tones) are unused. Each of the 80 MHz SB tone plans 800a and 800b of FIG. 8A is divided into four PHY 20 MHz SBs 802a-802d. As generally shown in FIG. 8A, the first PHY 20 MHz SB 802a may include 256 tones in an index range of [−512, −257] that includes the 12 left edge or guard tones and the adjacent 244 tones in the RUs shown (e.g., the first 242-tone RU and two tones of the second 242-tone RU adjacent to the first 242-tone RU). The second PHY 20 MHz SB 802b may include 256 tones in an index range of [−256, −1] that includes the remaining 240 tones of the second 242-tone RU, the first 13 unused tones adjacent to the second 242-tone RU (the first 13-tone block may be a first part of a 26-tone RU split), and 3 tones of the 7 DC tones. The third PHY 20 MHz SB 802c may include 256 tones in an index range of [0, 255] that includes the remaining 4 tones of the 7 DC tones, the second 13 unused tones adjacent to the 7 DC tones (the second 13-tone block may be a second part of a 26-tone RU split), and 239 tones of the third 242-tone RU adjacent to the second 13 unused tones. The fourth PHY 20 MHz SB 802d may include 256 tones in an index range of [256, 511] that includes the remaining 3 tones of the third 242-tone RU, the entire fourth 242-tone RU unit adjacent to the third 242-tone RU unit, and the 11 right edge or guard tones. As shown in FIG. 8A, when the 80 MHz SB tone plan may be adjusted or modified for boundary alignment, the RUs in the first and fourth PHY 20 MHz SBs (e.g., 802a and 802d) may not move, but the RUs in the second PHY 20 MHz SB 802b may shift to the right by A tones (subcarrier indices for these RU boundaries, null tones, and pilot tones are increased by A) and the RUs in the third PHY 20 MHz SB 802c may shift to the left by A tones (subcarrier indices for these RU boundaries, null tones, and pilot tones are reduced by A). This can be seen by the insertion of A unused tones to [−258, −259+A] and insertion of A unused tones to [259−A, 259]. As noted above, A is greater than or equal to 5 and less than or equal to 13.

After the boundary alignment shown, the first PHY 20 MHz SB 802a may include the 12 left edge tones, the first 242-tone RU, and 2 tones of the first A unused tones. The second PHY 20 MHz SB 802b may include the remaining (A−2) tones of the first A unused tones, the second 242-tone RU, and at least 3 tones of the 7 DC tones (assuming A=13, where the 13 null tones RUs do not exist). The third PHY 20 MHz SB 802c may include the remaining 4 DC tones, the third 242-tone RU, and 10 tones of the second A unused tones. The fourth PHY 20 MHz SB 802d may include the remaining 3 tones of the second A-tone RU, the fourth 242-tone RU, and the 11 right edge or guard tones.

In some embodiments, where the minimum RU size is 52-tones, 26-tone RUs may be unused. FIG. 8B shows another example modified 80 MHz SB tone plan 850 for boundary alignment, according to another embodiment. Accordingly, the 160 MHz tone plan described in relation to Option 2 and the 320 MHz tone plans described in relation to Options 1b, 2a, and 2b may be modified according to 80 MHz SB tone plan for boundary alignment.

The 80 MHz SB tone plan 850 of FIG. 8B is divided into four PHY 20 MHz SBs 852a-852d. In such a modification, as shown in FIG. 8B, when the 80 MHz SB tone plan 850 is adjusted or modified for boundary alignment, the RUs, null tones, data tones, and pilot tones in the second PHY 20 MHz 852b may be shifted to the right by A tones, where A is greater than or equal to 5 and less than or equal to 13 (i.e., subcarrier indices+A). The RUs, null tones, data tones, and pilot tones in the third PHY 20 MHz 852c may be shifted to the left by A tones, where A is greater than or equal to 5 and less than or equal to 13 (i.e., subcarrier indices−A), similar to the modification described in relation to FIG. 8A herein. However, unlike the modification described in relation to FIG. 8A, if the first and fourth PHY 20 MHz SBs (e.g., 852a and 852d) are located at the edge of the 160 or 320 MHz BW, then the first and second 52-tone RUs and the first 106-tone RU in the first PHY 20 MHz SB 852a shift to the right by B tones, where B is greater than or equal to 0 tones and less than or equal to 26 tones, to create a larger guard band at the left edge. In such a modification, 242-tones may not be used in such a first PHY 20 MHz SB. Instead, 52- or 106-tone RUs may be utilized. The last two 52-tone RUs and the fourth 106-tone RU in the fourth PHY 20 MHz SB 852d shift to the left by B tones, where B is greater than or equal to 0 tones and less than or equal to 26 tones, to create a larger guard band at the right edge. As noted above, in such a modification, 242-tones may not be used in such a fourth PHY 20 MHz SB. Instead, 52- or 106-tone RUs may be utilized.

Figure 9A:
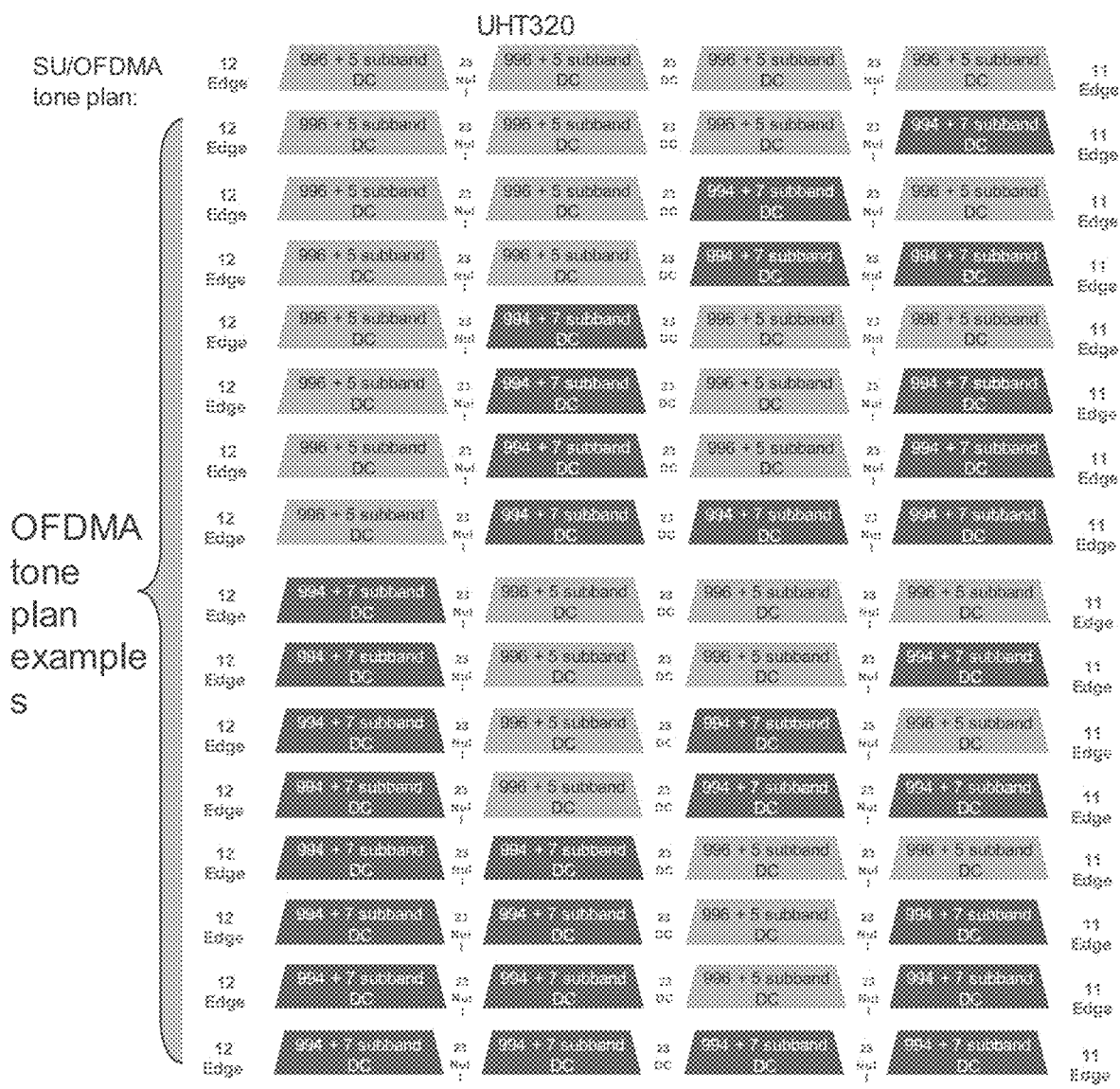
FIG. 9A shows an example 4×320 MHz tone plan proposal using duplicates of 2 HE160 or duplicates of 4 HE80 tone plans, according to an embodiment.

FIG. 9A shows an example 4×320 MHz tone plan proposal using duplicates of 2 HE160 or duplicates of 4 HE80 tone plans, according to an embodiment.

Figure 9B:
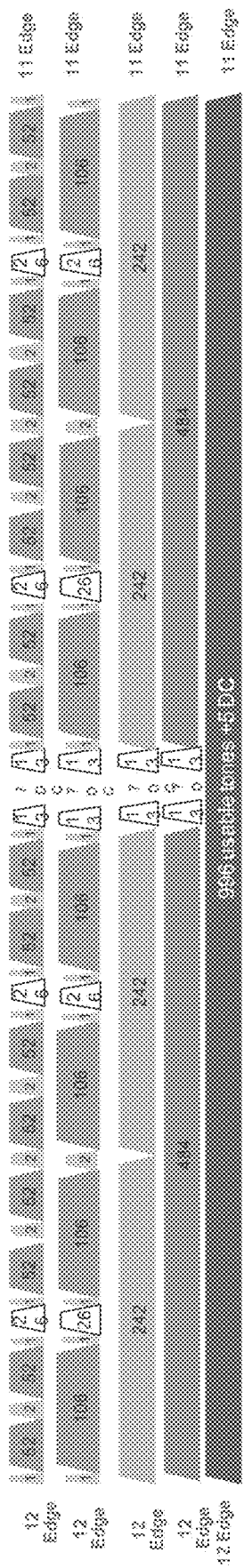
FIG. 9B shows an example 320 MHz tone plan proposal where the minimum RU size is restricted to be at least 52-tones as described herein, according to an embodiment.

FIG. 9B shows an example 320 MHz tone plan proposal where the minimum RU size is restricted to be at least 52-tones as described herein, according to an embodiment.

In some aspects, the selected 4× tone plan may be selected independent of a hardware implementation and regardless of bandwidth mode (e.g., 320 MHz vs. 4×80 MHz, or 160+80 MHz vs. 3×80 MHz).

FIGS. 10A-10D show examples of RU subcarrier indices, according to one embodiment. Two options may exist for 2× symbol duration tone plans. For example, in the first option (2× Option 1), the 2× symbol duration tone plans may be derived from 802.11ac 1× symbol duration tone plans. For OFDMA communications, 2× symbol duration tone plans for the ultra-high throughput (UHT) 320 MHz bandwidth (e.g., UHT320) is formed by downclocking the very high throughput (VHT) 20/40/80 tone plans (e.g., the 802.11ac 20/40/80 tones plans), respectively, by 2 in the PHY 10/20/40 sub-band, depending on the OFDMA allocations. In some aspects, RU sizes of 56, 114, 242, 484 (which is formed by 242×2), 968 (which is formed by 242×4), and/or 1936 (which is formed by 242×8) may be utilized for the tone plans. Such tone plans may have various properties, including smallest OFDMA granularity of 8.75 MHz for the 56-tone RU. Additionally, the new 56- and 114-tone RUs provide for higher efficiencies in communications as compared to the HE 52 and 106-tone RUs. However, the 968-tone RU provides for less efficient communications as compared to HE 996-tone RUs. Additionally, such 2× tone plans per 2× Option 2 may leverage hardware and PHY 20 MHz boundary alignment for preamble puncturing. In some aspects, the 56-tone RUs may cause 4 left+3 right or 6 left and +5 right guard tone configurations to be insufficient for DL communications, which may result in the edge RUs being disabled. For non-OFDMA communications (e.g., SU communications), all allocations are used.

Figure 10A:
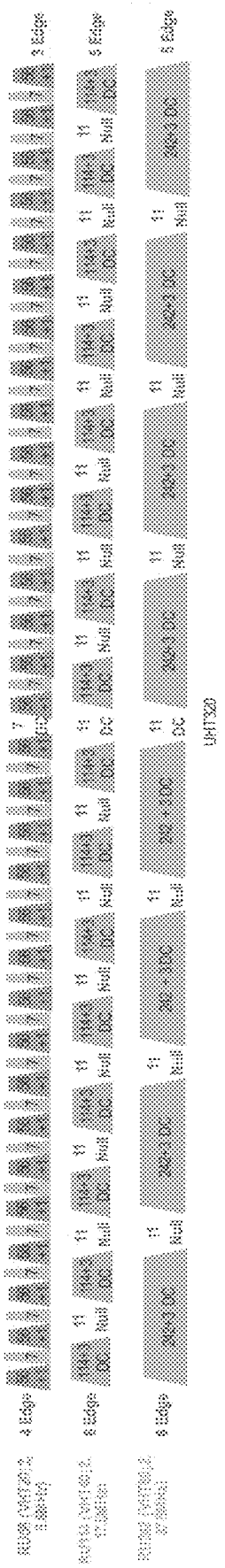
FIGS. 10A through 10D show examples of RU subcarrier indices, according to one embodiment.

FIG. 10A shows 56-tone, 114-tone, and 242-tone RUs tone plans for the UHT320 (2× Option 1). The 56-tone RU tone plan is based on the VHT20 downclocked by 2 and resulting in OFDMA granularity of 8.75 MHz. As shown, the 56-tone RUs are separated by 7 null tones with a 4 left+3 right guard tone configuration. Each 56-tone RU also includes a 1-tone sub-band DC (e.g., the "56+1" shown). The 114-tone RU tone plan is based on the VHT40 downclocked by two and resulting in OFDMA granularity of 17.5 MHz. As shown, the 114-tone RUs are separated by 11 null tones with a 6 left+5 right guard tone configuration. Each 114-tone RU also includes a 3-tone sub-band DC (e.g., the "114+3" shown). The 242-tone RU tone plan is based on the VHT80 downclocked by two and resulting in OFDMA granularity of 37.8 MHz. As shown, the 242-tone RUs are separated by 11 null tones with a 6 left+5 right guard tone configuration. Each 242-tone RU also includes a 3-tone sub-band DC (e.g., the "242+3" shown).

In the second option (2× Option 2), the 2× symbol duration tone plans may be derived from 802.11ax 4× symbol duration tone plans. Accordingly, the UHT80 (e.g., UHT 80 MHz) tone plan uses the high efficiency (HE) 40 SU/OFDMA tone plans upclocked by 2. For OFDMA communications, 2× symbol duration tone plans for the ultra-high throughput (UHT) 80 MHz bandwidth (e.g., UHT80) are formed by upclocking the HE40 tone plans by 2. In some aspects, RU sizes of 26, 52, 106, 242, and/or 484 (which is formed by 242×2) may be utilized for the tone plans. Such tone plans may have various properties, including a smallest OFDMA granularity of 4.0625 MHz for the 26-tone RU. Additionally, the 52- and 106-tone RUs provide for lower efficiencies in communications as compared to the 56- and 114-tone RUs described in 2× Option 1. The 2× Option 2 tone plan may also leverage hardware but not be preamble puncturing friendly for the PHY 20 MHz sub-band is the minimum frequency chunk. However, by disabling specific RUs (e.g., the $5^{th}$ and $14^{th}$ 26-tone RUs) may be disabled to provide for alignment at the PHY 20 MHz boundaries and tone plan for preamble puncturing.

Figure 10B:
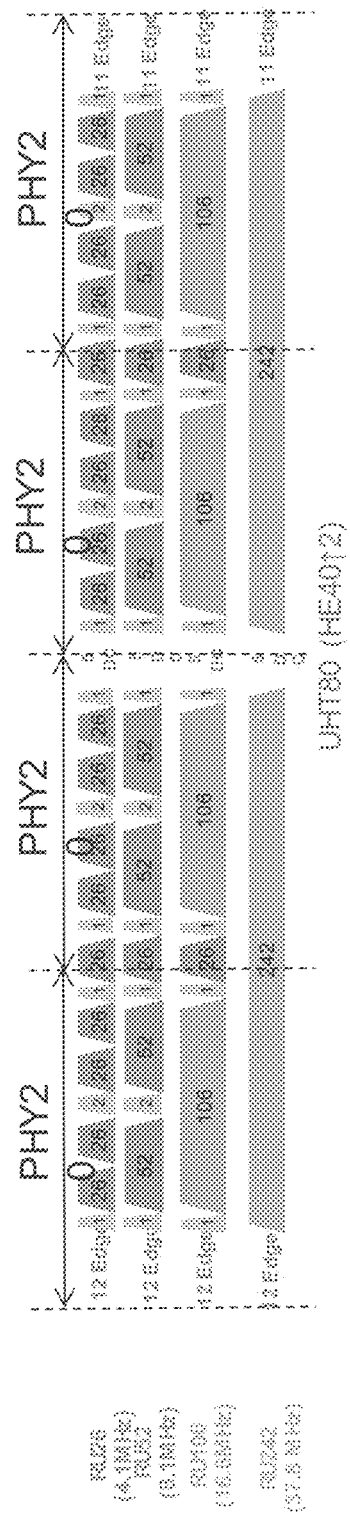

FIG. 10B shows 26-tone, 52-tone, 106-tone, and 242-tone RUs tone plans for the UHT80 (2× Option 2). The 26-tone RU tone plan has a granularity of ~4.1 MHz. As shown, the 26-tone RUs are separated by various quantities of null tones (e.g., 1 null tone and/or 2 null tones) with a 12 left+11 right guard tone configuration and a 5-tone DC. The 52-tone RU tone plan has a granularity of ~8.1 MHz. As shown, the 52-tone RUs are separated by various amounts of null tones (e.g., 1 and/or 2 null tones) with a 12 left+11 right guard tone configuration and a 5-tone DC. The 106-tone RU tone plan has a granularity of ~16.6 MHz. As shown, the 106-tone RUs are separated by 1 null tone with a 12 left+11 right guard tone configuration and a 5-tone DC. The 1 null tone may separate the 106-tone RUs from the edge tones, from 26-tone RUs, and from the 5-tone DC. The 242-tone RU tone plan has a granularity of ~37.8 MHz. As shown, the 242-tone RUs have a 12 left+11 right guard tone configuration and a 5-tone DC. In such aspects, the minimum frequency chunk for preamble puncturing for these tone plans is PHY 20 MHz. As noted herein, since the $5^{th}$ and $14^{th}$ 26-tone RUs cross the PHY 20 MHz boundary, these RUs may be disabled if preamble puncturing is used.

Figure 10C:
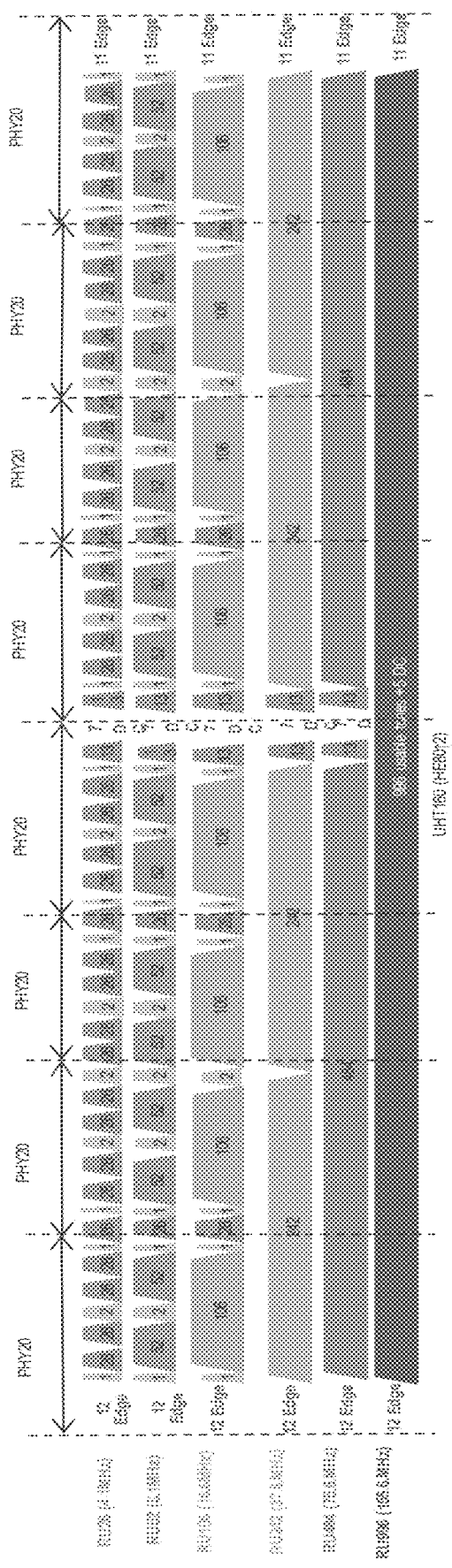

The UHT160 tone plan and the UHT320 tone plan may be based on the HE80 and RE160 tones plans, respectively, each upclocked by 2 (2× Option 2A). FIG. 10C shows 26-tone, 52-tone, 106-tone, 242-tone, 484-tone, and 996-tone RUs tone plans for the 2× UHT160/320 by HE80/HE160 upclocking by 2 (2× Option 2A). The 26-tone RU tone plan has a granularity of ~4.1 MHz. As shown, the 26-tone RUs are separated by 1 and/or 2 null tones with a 12 left+11 right guard tone configuration and a 7-tone DC with 13-tone RUs on either side of the 7-tone DC. The 52-tone RU tone plan has a granularity of ~8.1 MHz. As shown, the 52-tone RUs are separated by 1 and/or 2 null tones with a 12 left+11 right guard tone configuration and a 7-tone DC with 13-tone RUs on either side of the 7-tone DC. The 106-tone RU tone plan has a granularity of ~16.6 MHz. As shown, the 106-tone RUs are separated by 1 and/or 2 null tones with a 12 left+11 right guard tone configuration and a 7-tone DC with 13-tone RUs on either side of the 7-tone DC. The 242-tone RU tone plan has a granularity of ~37.8 MHz. As shown, the 242-tone RUs has a 12 left+11 right guard tone configuration and a 7-tone DC with 13-tone RUs on either side of the 7-tone DC. As shown, the 484-tone RUs have a 12 left+11 right guard tone configuration and a 7-tone DC with 13-tone RUs on either side of the 7-tone DC with 13-tone RUs on either side of the 7-tone DC. As shown, the 996-tone RU is one single 996-tone RU with a 12 left+11 right guard tone configuration and no DC. No preamble puncturing (e.g., alignment) may occur at PHY 20 MHz chunks because these tone plans are not preamble puncturing friendly. For example, with PHY 20 MHz chunks, various tones cross the 20 MHz boundaries, including the $5^{th}$ 26-tone RU, the $10^{th}$ 26-tone RU, the $5^{th}$ 52-tone RU, the $3^{rd}$ 106-tone RU, the $14^{th}$ 26-tone RU, the $24^{th}$ 26-tone RU, the $28^{th}$ 26-tone RU, the $12^{th}$ 52-tone RU, the $6^{th}$ 106-tone RU, and the $33^{rd}$ 26-tone RU. Each of these RUs may have different numbers of tones that cross the respective 20 MHz boundaries.

Figure 10D:
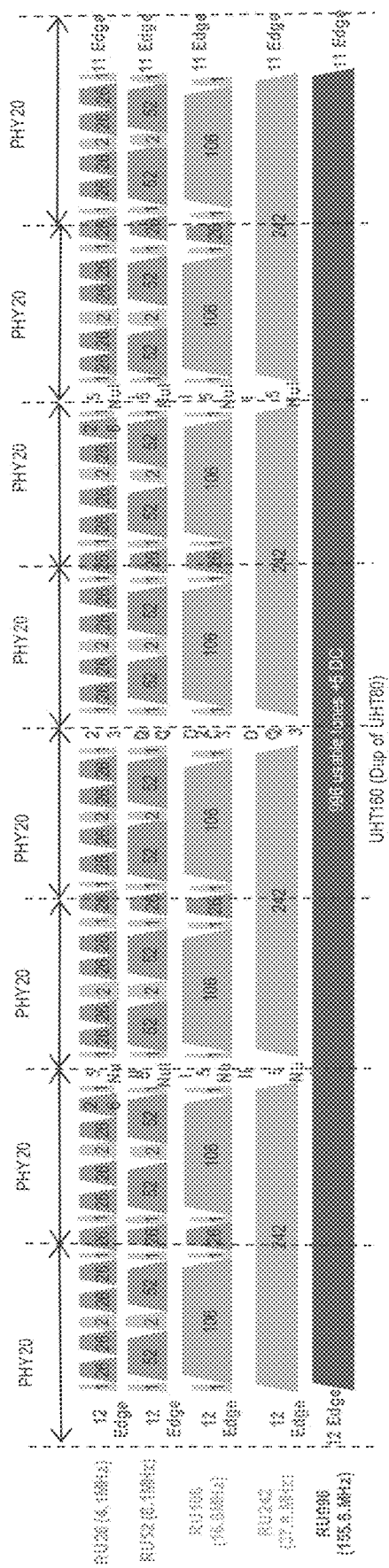

Alternatively, the UHT160 and UHT320 tone plans may be based on duplications of two and four UHT80 tone plans, respectively (2× Option 2B). FIG. 10D shows 26-tone, 52-tone, 106-tone, 242-tone, and 996-tone RUs tone plans for the 2× UHT160/320 using duplications of 2/4 UHT80 tone plans (2× Option 2B). The 26-tone RU tone plan has a granularity of ~4.1 MHz. As shown, the 26-tone RUs are separated by 1 and/or 2 null tones with a 12 left+11 right guard tone configuration and a 23-tone DC separating the $4^{th}$ and $5^{th}$ PHY20 blocks and 5 null tones separating the $2^{nd}$ and $3^{rd}$ PHY20 blocks and the $6^{th}$ and $7^{th}$ PHY20 blocks. The 52-tone RU tone plan has a granularity of ~8.1 MHz. As shown, the 52-tone RUs are separated by 1 and/or 2 null tones with a 12 left+11 right guard tone configuration and a 23-tone DC separating the $4^{th}$ and $5^{th}$ PHY20 blocks and 5 null tones separating the $2^{nd}$ and $3^{rd}$ PHY20 blocks and the $6^{th}$ and $7^{th}$ PHY20 blocks. The 106-tone RU tone plan has a granularity of ~16.6 MHz. As shown, the 106-tone RUs are separated by 26-tone RUs and 1 null tone with a 12 left+11 right guard tone configuration and a 23-tone DC separating the $4^{th}$ and $5^{th}$ PHY20 blocks and 5 null tones separating the $2^{nd}$ and $3^{rd}$ PHY20 blocks and the $6^{th}$ and $7^{th}$ PHY20 blocks. The 242-tone RU tone plan has a granularity of ~37.8 MHz. As shown, the 242-tone RUs are separated by 5 null tones with a 12 left+11 right guard tone configuration and a 23-tone DC. As shown, the 996-tone RU is one single 996-tone RU with a 12 left+11 right guard tone configuration and no DC. PHY 20 MHz boundary alignment for preamble puncturing may be accomplished by disabling the $5^{th}$, $14^{th}$, $23^{rd}$, and $32^{nd}$ 26-tone RUs with only a slightly lowered efficiency as compared to 2× Option 2A.

FIGS. 11A-11G show examples of RU subcarrier indices, according to various embodiments. Three general options may exist for 1× symbol duration tone plans. For example, in the first option (1× Option 1), the 1× symbol duration tone plans may be derived from 802.11ac 1× symbol duration tone plans. For OFDMA communications, 1× symbol duration tone plans for the UHT320 is formed based on the VHT20/40/80 tone plans (e.g., the 802.11ac 20/40/80 tones plans) in the PHY 20/40/80 sub-band, depending on the OFDMA allocations. In some aspects, RU sizes of 56, 114, 242, 484 (which is formed by 242×2), and 968 (which is formed by 242×4) may be utilized for the tone plans. Such tone plans may have various properties, including smallest OFDMA granularity of 17.5 MHz for the 56-tone RU. Additionally, the new 56- and 114-tone RUs provide for higher efficiencies in communications as compared to the HE 52- and 106-tone RUs, but the SU may have a lower efficiency. Additionally, such 1× tone plans per 1× Option 1 may leverage hardware and PHY 20 MHz boundary alignment for preamble puncturing. In some aspects, the 4 left+3 right guard tone configuration may be insufficient when 56-tone RUs are used at edges.

Figure 11A:
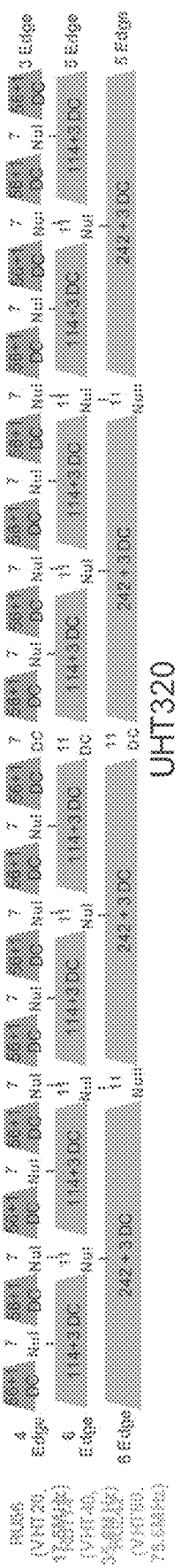
FIGS. 11A through 11G show examples of RU subcarrier indices, according to various embodiments.

FIG. 11A shows 56-tone, 114-tone, and 242-tone RUs tone plans for the UHT320 (1× Option 1). The 56-tone RU tone plan is based on the VHT20 tone plan and results in OFDMA granularity of 17.5 MHz. As shown, the 56-tone RUs are separated by 7 null tones with a 4 left+3 right guard tone and a 7-tone DC configuration. Each 56-tone RU also includes a 1-tone sub-band DC (e.g., the "56+1" shown). The 114-tone RU tone plan is based on the VHT40 tone plan and results in OFDMA granularity of 35.6 MHz. As shown, the 114-tone RUs are separated by 11 null tones with a 6 left+5 right guard tone and 11-tone DC configuration. Each 114-tone RU also includes a 3-tone sub-band DC (e.g., the "114+3" shown). The 242-tone RU tone plan is based on the VHT80 tone plan and results in OFDMA granularity of 75.6 MHz. As shown, the 242-tone RUs are separated by 11 null tones with a 6 left+5 right guard tone and 11-tone DC configuration. Each 242-tone RU also includes a 3-tone sub-band DC (e.g., the "242+3" shown).

In the second option (1× Option 2), the 1× symbol duration tone plans may be derived from 802.11ax 4× symbol duration tone plans. Accordingly, the UHT80 tone plan uses the high efficiency HE20 SU/OFDMA tone plans upclocked by 4. In some aspects, RU sizes of 26, 52, 106, and 242 may be utilized for the tone plans. Such tone plans may have various properties, including smallest OFDMA granularity of 8.125 MHz for the 26-tone RU. Additionally, the 52- and 106-tone RUs provide for lower efficiencies in communications as compared to the 56- and 114-tone RUs of 1× Option 1. Additionally, such 1× tone plans per 1× Option 2 may leverage hardware although they may not be preamble puncturing friendly with PHY 20 MHz frequency chunks. For example, the $3^{rd}$ 26-tone RU and the $2^{nd}$ 52-tone RU may cross the PHY 20 MHz boundary along with the $7^{th}$ 26-tone RU and the $3^{rd}$ 52-tone RU.

Figure 11B:
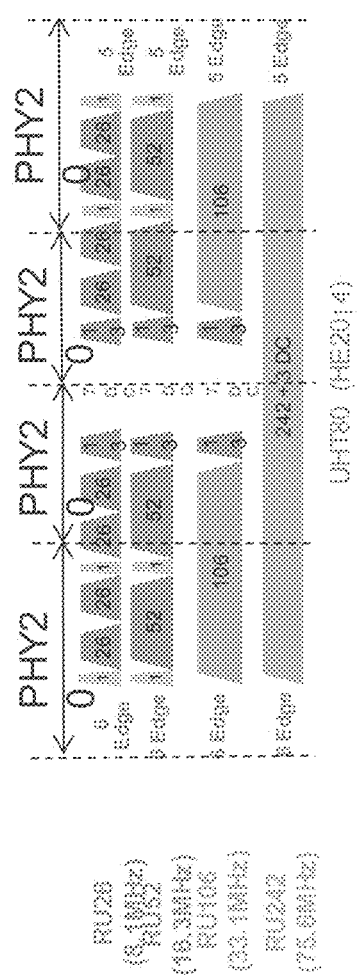

FIG. 11B shows 26-tone, 52-tone, 106-tone, and 242-tone RUs tone plans for the 1× UHT80 derived from HE20 upclocked by 4 (1× Option 2). The 26-tone RU tone plan has a granularity of ~8.1 MHz. As shown, the 26-tone RUs have a 6 left+5 right guard tone configuration with a 7-tone DC and 13-tone RUs on either side of the 7-tone DC. 1 null tone separates the $1^{st}$ 26-tone RU from the left edge, the $2^{nd}$ 26-tone RU from the $3^{rd}$ 26-tone RU, the $6^{th}$ 26-tone RU from the $7^{th}$ 26-tone RU, and the $9^{th}$ 26-tone RU from the right edge. The 52-tone RU tone plan has a granularity of ~16.3 MHz. As shown, the 52-tone RUs have a 6 left+5 right guard tone configuration and a 7-tone DC and 13-tone RUs on either side of the 7-tone DC. 1 null tone separate the $1^{st}$ 52-tone RU from the left edge, the $1^{st}$ 52-tone RU from the $2^{nd}$ 52-tone RU, the $3^{rd}$ 52-tone RU from the $4^{th}$ 52-tone RU, and the $4^{th}$ 26-tone RU from the right edge. The 106-tone RU tone plan has a granularity of ~33.1 MHz. As shown, the 106-tone RUs have a 6 left+5 right guard tone configuration and a 7-tone DC and 13-tone RUs on either side of the 7-tone DC. As shown, the 242-tone RU has a 6 left+5 right guard tone configuration. Each 242-tone RU also includes a 3-tone sub-band DC (e.g., the "242+3" shown).

Figure 11C:
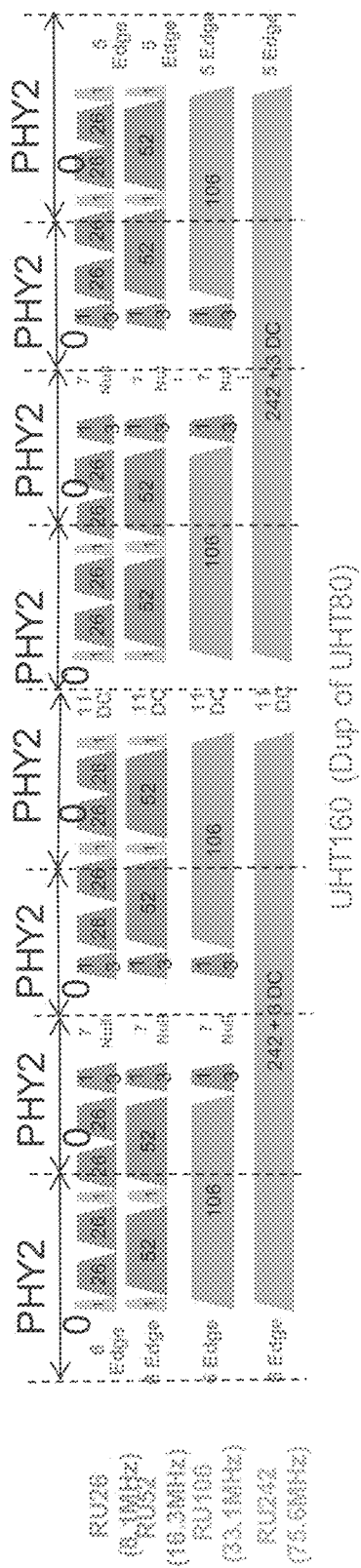

The UHT160 and UHT320 tone plans may use duplications of 2/4 UHT80 tone plans, respectively (1× Option 2A). FIG. 11C shows 26-tone, 52-tone, 106-tone, and 242-tone RUs tone plans for the 1× UHT160 using duplicates of two UHT80 tones plans (1× Option 2A). The 26-tone RU tone plan has a granularity of ~8.1 MHz. As shown, the 26-tone RUs have a 6 left+5 right guard tone configuration with an 11-tone DC and 1 null tone on either side of the 11-tone DC. 1 null tone separate the $1^{st}$ 26-tone RU from the left edge, the $2^{nd}$ 26-tone RU from the $3^{rd}$ 26-tone RU, the $6^{th}$ 26-tone RU from the $7^{th}$ 26-tone RU, and the $10^{th}$ 26-tone RU from the $11^{th}$ 26-tone RU, the $14^{th}$ 26-tone RU from the $15^{th}$ 26-tone RU, and the $16^{th}$ 26-tone RU from the right edge. 7 null tones are bounded by 13-tone RUs on either side separate the $4^{th}$ 26-tone RU from the $5^{th}$ 26-tone RU and the $12^{th}$ 26-tone RU from the $13^{th}$ 26-tone RU. The 52-tone RU tone plan has a granularity of ~16.3 MHz. As shown, the 52-tone RUs have a 6 left+5 right guard tone configuration with an 11-tone DC and 1 null tone on either side of the 11-tone DC. 1 null tone separates the $1^{st}$ 52-tone RU from the left edge, the $1^{st}$ 52-tone RU from the $2^{nd}$ 52-tone RU, the $3^{rd}$ 52-tone RU from the $4^{th}$ 52-tone RU, the $5^{th}$ 52-tone RU from the $6^{th}$ 52-tone RU, and the $7^{th}$ 52-tone RU from the $8^{th}$ 52-tone RU. 7 null tones bounded by 13-tone RUs on either side separate the $2^{nd}$ 52-tone RU from the $3^{rd}$ 52-tone RU and the $6^{th}$ 52-tone RU from the $7^{th}$ 52-tone RU. The 106-tone RU tone plan has a granularity of ~33.1 MHz. As shown, the 106-tone RUs have a 6 left+5 right guard tone configuration and a 11-tone DC. 7 null tones bounded by 13-tone RUs on either side separate the $1^{st}$ 106-tone RU from the $2^{nd}$ 106-tone RU and the $3^{rd}$ 106-tone RU from the $4^{th}$ 102-tone RU. The 242-tone RU tone plan has a granularity of 75.6 MHz. As shown, the 242-tone RU has a 6 left+5 right guard tone configuration and an 11-tone DC. As discussed, 1× Option 2A is not preamble puncturing friendly when PHY 20 MHz chunks are used. Each 242-tone RU also includes a 3-tone sub-band DC (e.g., the "242+3" shown).

Figure 11D:
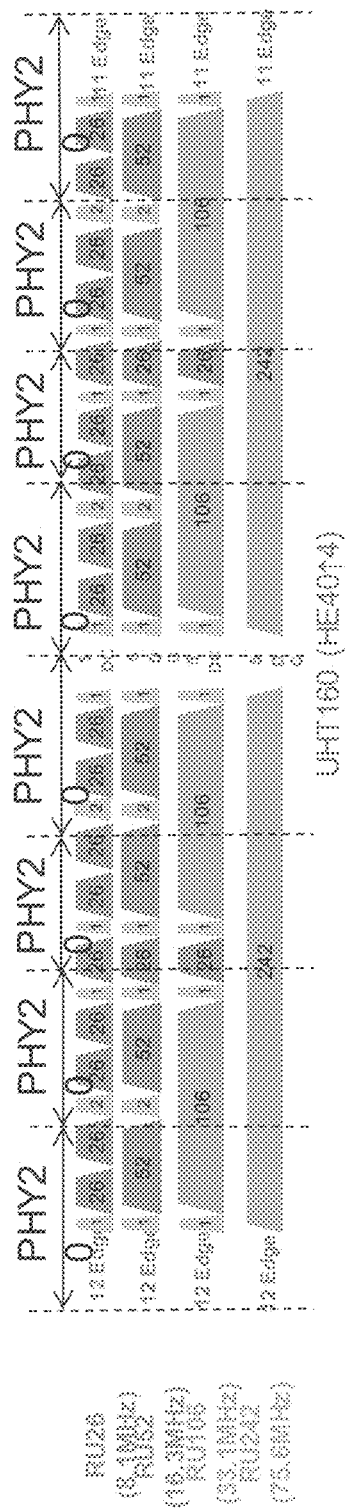

Alternatively, the UHT160 and UHT320 tone plans may use HE40 and HT80 tone plans upclocked by 4, respectively (1× Option 2B). FIG. 11D shows 26-tone, 52-tone, 106-tone, and 242-tone RUs tone plans for the 1× UHT160 based on HE40 upclocked by 4 tones plans (1× Option 2B). The 26-tone RU tone plan has a granularity of ~8.1 MHz. As shown, the 26-tone RUs have a 12 left+11 right guard tone configuration with a 5-tone DC and 1 null tone on either side of the 5-tone DC. 1 and/or 2 null tones separate the 26-tone RUs from each other and from the edges. The 52-tone RU tone plan has a granularity of ~16.3 MHz. As shown, the 52-tone RUs have a 12 left+11 right guard tone configuration with a 5-tone DC and 1 null tone on either side of the 5-tone DC. 1 and/or 2 null tones separate the 52-tone RUs from each other and from the edges. The 106-tone RU tone plan has a granularity of ~33.1 MHz. As shown, the 106-tone RUs have a 12 left+11 right guard tone configuration and a 5-tone DC with 1 null tone on either side of the 5-tone DC. 1 and/or 2 null tones separate the 106-tone RUs from each other and from the edges. The 242-tone RU tone plan has a granularity of 75.6 MHz. As shown, the 242-tone RU has a 12 left+11 right guard tone configuration and a 5-tone DC. As discussed, 1× Option 2A is not preamble puncturing friendly when PHY 20 MHz chunks are used. For example, with PHY 20 MHz chunks, various tones of the tone plan cross the 20 MHz boundaries, including the 2nd 26-tone RU, the 1st 52-tone RU, the 5th 26-tone RU, the 7th 26-tone RU, the 3rd 52-tone RU, the 12th 26-tone RU, the 6th 52-tone RU, and the 14th 26-tone RU. Each of these RUs may have different numbers of tones that cross the respective 20 MHz boundaries. The 17th 26-tone RU and the 8th 52-tone RU may not have enough guard bands with PHY 20 MHz chunks.

Figure 11E:
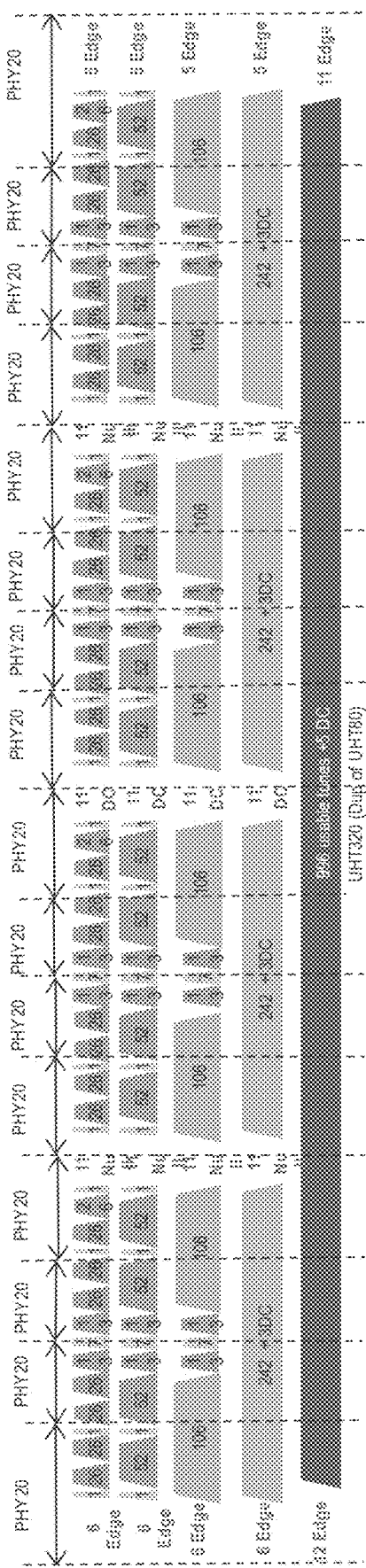

FIG. 11E shows 26-tone, 52-tone, 106-tone, 242-tone, and 996-tone RU tone plans for the 1× UHT320 tone plan based on duplication of four HE80 tones plans (1× Option 2A). As shown, the 26-tone RUs have a 6 left+5 right guard tone configuration with an 11-tone DC and 1 null tone on either side of the 11-tone DC. 1 and/or 7 null tones may separate the 26-tone RUs from each other and from the edges. As shown, the 52-tone RUs have a 6 left+5 right guard tone configuration with an 11-tone DC and 1 null tone on either side of the 11-tone DC. 1 and/or 7 null tones may separate the 52-tone RUs from each other and from the edges. As shown, the 106-tone RUs have a 6 left+5 right guard tone configuration and an 11-tone DC with 1 null tone on either side of the 11-tone DC. Various sized RUs or null tones may separate the 106-tone RUs from each other and from the edges. As shown, the 242-tone RU has a 6 left+5 right guard tone configuration and an 11-tone DC. Each 242-tone RU also includes a 3-tone sub-band DC (e.g., the "242+3" shown). As shown, the 996-tone RU has a 12 left+11 right guard tone configuration. Each 996-tone RU also includes a 5-tone sub-band DC (e.g., the "996+5" shown). As discussed, 1× Option 2A is not preamble puncturing friendly when PHY 20 MHz chunks are used.

Figure 11F:
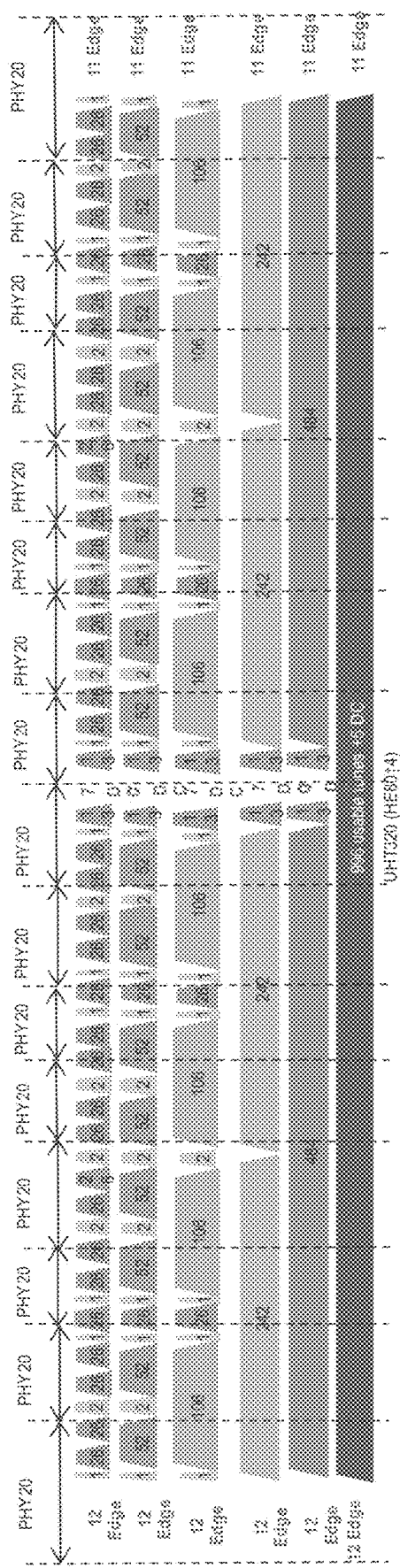

FIG. 11F shows 26-tone, 52-tone, 106-tone, 242-tone, 484-tone, and 996-tone RUs tone plans for the 1× UHT320 based on HE80 upclocked by 4 tones plans (1× Option 2B). As shown, the 26-tone RUs have a 12 left+11 right guard tone configuration with a 7-tone DC and 13-tone RUs on either side of the 7-tone DC. Various sized RUs separate the 26-tone RUs from each other and from the edges. As shown, the 52-tone RUs have a 12 left+11 right guard tone configuration with a 7-tone DC and 13-tone RUs on either side of the 7-tone DC. Various sized RUs separate the 52-tone RUs from each other and from the edges. As shown, the 106-tone RUs have a 12 left+11 right guard tone configuration and a 7-tone DC with 13-tone RUs on either side of the 7-tone DC. Various sized RUs separate the 106-tone RUs from each other and from the edges. As shown, the 242-tone RU has a 12 left+11 right guard tone configuration and a 7-tone DC with 13-tone RUs on either side of the 7-tone DC. As shown, the 484-tone RU has a 12 left+11 right guard tone configuration and a 7-tone DC with 13-tone RUs on either side of the 7-tone DC. As shown, the 996-tone RU has a 12 left+11 right guard tone configuration. Each 996-tone RU also includes a 5-tone sub-band DC (e.g., the "996+5" shown). As discussed, 1× Option 2B is not preamble puncturing friendly when PHY 20 MHz chunks are used. The depicted 1× symbol duration tone plan may also not be preamble puncturing friendly when PHY 40 MHz chunks are used. For example, various RUs may have different numbers of tones that cross the respective 20 MHz or 40 MHz boundaries. And certain other RUs may not have enough guard bands with PHY 20 MHz or 40 MHz chunks.

In the third option (1× Option 3), the 1× symbol duration tone plans may be modified from 11ax 4× tone plans. UHT40 is duplicated from 2 UHT20 tone plans. UHT80 is duplicated from 2 UHT40 tone plans. UHT160 is duplicated from 2 UHT80 tone plans. UHT320 is duplicated from 2 UHT160 tone plans. In some aspects, RU sizes of 26, 52, 106, 242, 484 (which is formed by 242×2), and 968 (which is formed by 242×4) may be utilized for the tone plans. Such tone plans may have various properties. For example, the 52- and 106-tone RUs provide for lower efficiencies in communications as compared to the 56- and 114-tone RUs in 1× Option 1, but the SU has higher efficiencies. The smallest OFDMA granularity is 8.125 MHz for the 26-tone RU. Additionally, the tone plans may be able to utilize preamble puncturing at 20 MHz chunks and pilot tone locations may not be aligned.

Figure 11G:
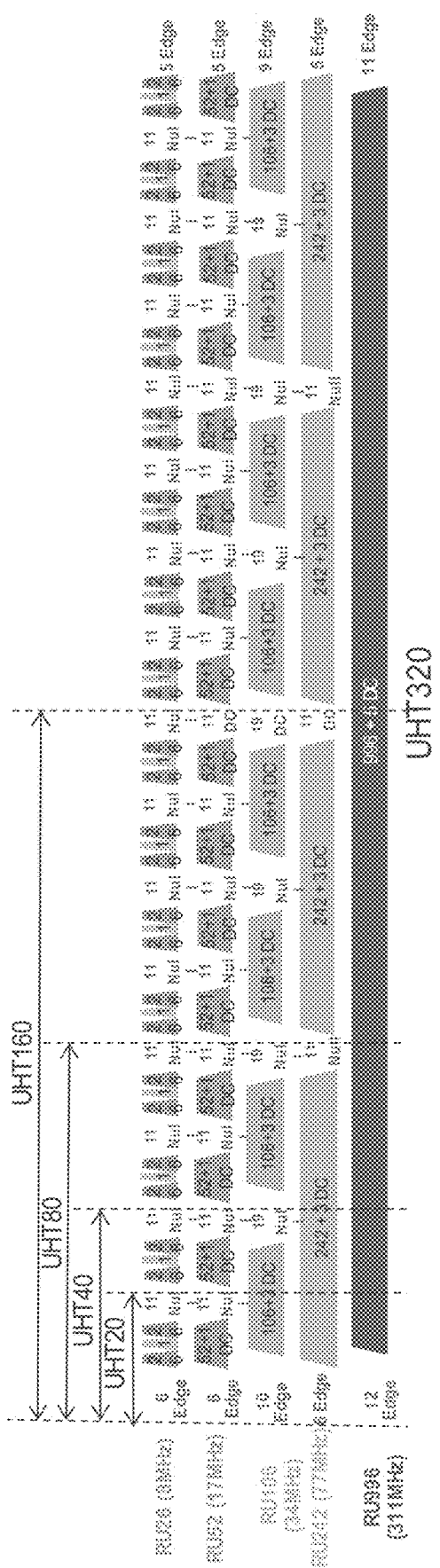

FIG. 11G shows 26-tone, 52-tone, 106-tone, 242-tone, and 996-tone RUs tone plans for 1× Option 3. As shown, the 26-tone RUs have a 6 left+5 right guard tone configuration. Various sized RUs separate the 26-tone RUs from each other and from the edges with 11 null tones interspaced. As shown, the 52-tone RUs have a 6 left+5 right guard tone configuration with an 11-tone DC. 11 null tones are interspaced between the 52-tone RUs. Each 52-tone RU also includes a 1-tone sub-band DC (e.g., the "52+1" shown). As shown, the 106-tone RUs have a 10 left+9 right guard tone configuration and a 19-tone DC. 19 null tones are interspaced between the 106-tone RUs. Each 106-tone RU also includes a 3-tone sub-band DC (e.g., the "106+3" shown). As shown, the 242-tone RUs have a 6 left+5 right guard tone configuration and a 11-tone DC. 11 null tones are interspaced between the 242-tone RUs. Each 242-tone RU also includes a 3-tone sub-band DC (e.g., the "242+3" shown). As shown, the 996-tone RU has a 12 left+11 right guard tone configuration. Each 996-tone RU also includes a 5-tone sub-band DC (e.g., the "996+5" shown).

FIG. 12 shows example tone plans that can be used with various FFT sizes and symbol durations at each of 80, 160, and 320 MHz sub-band transmissions, according to one embodiment. As shown in FIG. 12, the 1× symbol duration will have different tone plan designs based on VHT or HE. Similarly, the 2× symbol duration has different tone plan designs based on VHT or HE.

In some aspects, the 1× VHT based 80 MHz tone plan may be based on VHT80 tone plans or newly derived from VHT20/40/80 tone plans. In some aspects, the 1× VHT based 160 MHz tone plan may be based on VHT160 tone plans or newly derived from VHT20/40/80 tone plans. In some aspects, the 1× VHT based 320 MHz tone plan may be formed by VHT20/40/80 in the PHY 20/40/80, depending on OFDMA allocations.

In some aspects, the 1× HE based 80 MHz tone plan may use an HE20 tone plan upclocked by 4 or may be modified based on an HE20 tone plan upclocked by 4. In some aspects, the 1× HE based 160 MHz tone plan may duplicate two HE20 tone plans upclocked by 4, may use an HE40 tone plan upclocked by 4, or may be modified based on the HE40 tone plan upclocked by 4. In some aspects, the 1× HE based 320 MHz tone plan may duplicate four HE20 tone plans upclocked by 4, may use a HE80 tone plan upclocked by 4, or may be modified based on the HE80 tone plan upclocked by 4.

In some aspects, the 4×80 MHz tone plan may use a HE80 tone plan. In some aspects, the 4×160 MHz tone plan may a HE160 tone plan or may modify the HE160 tone plan. In some aspects, the 4×160 MHz tone plan may duplicate two HE160 tone plans or may modify the HE160 tone plans.

In some aspects, the 2× VHT based 80 MHz tone plan may use the VHT160 tone plans downclocked by 2 or may use a new tone plan derived from VHT40/80 tone plans. In some aspects, the 2× VHT based 160 MHz tone plan may duplicate two VHT160 tone plans downclocked by 2 or newly derive the tone plan from VHT40/80. In some aspects, the 2× VHT based 320 MHz tone plan may duplicate four VHT160 tone plans downclocked by 2 or form the tone plans by VHT20/40/80 downclocked by 2 in PHY10/20/40, depending on OFDMA allocations.

In some aspects, the 2× HE based 80 MHz tone plan may use a HE40 tone plan upclocked by 2 or may derive the tone plan from VHT40/80. In some aspects, the 2× HE based 160 MHz tone plan may use HE80 upclocked by 2 or may duplicate two HE40 tone plans upclocked by 2. In some aspects, the 2× HE based 320 MHz tone plan may use HE160 upclocked by 2 or may duplicate four HE40 tone plans upclocked by 2.

In some aspects, UHT80/160/320 tone plans may be used for the 80/160/320 MHz sub-bands, respectively, in the modes described herein. In some aspects, UHT80/160/320 may represent corresponding sub-band tone plans. For example, UHT80 may represent the tone plan used for the 80 MHz tone plan, while UHT160 may represent the tone plan used for the 160 MHz tone plan. In some aspects, for modes: 20/40/80/160/80+80 MHz, the same 11ax 4× tone plans may be used for these modes or different proposals for 1×/2×/4× symbol durations may be used, as shown below in FIGS. 13A-13C. The 80+80 MHz mode may use duplicates of two 80 MHz tone plans.

Figure 13B:
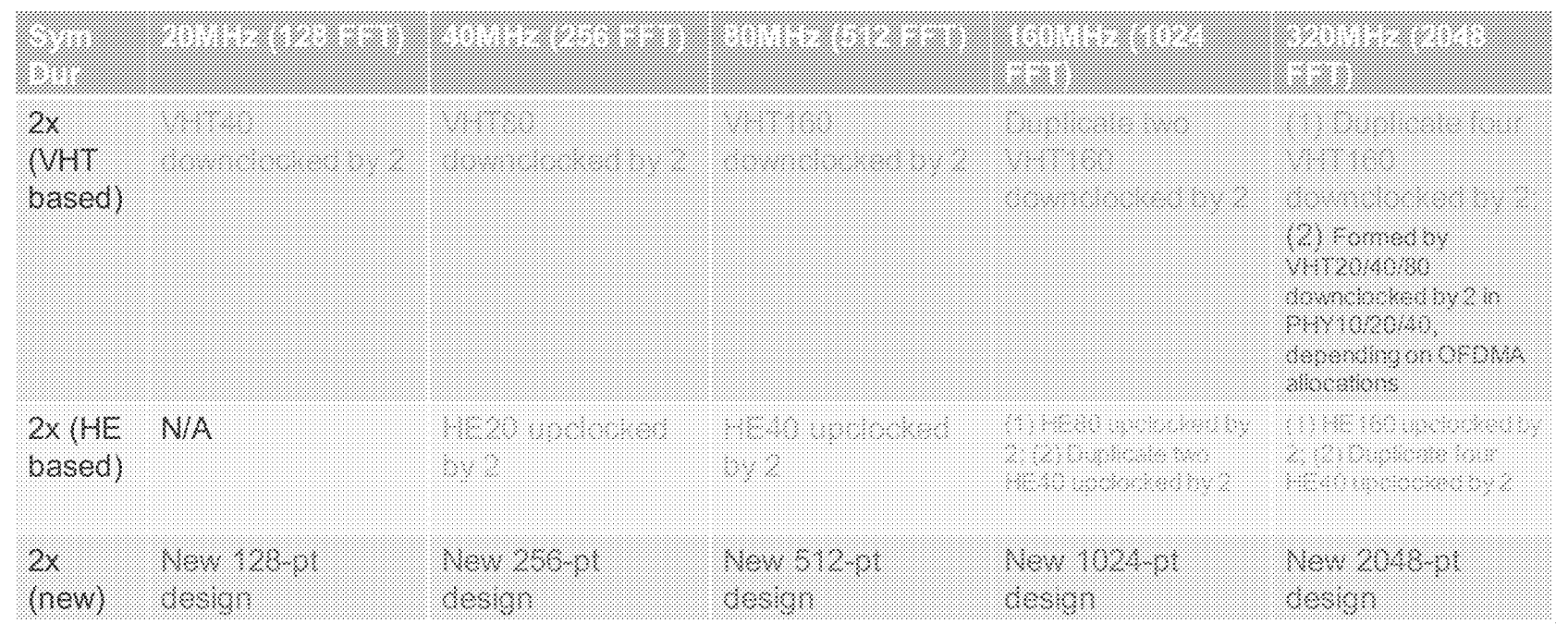

FIG. 13A shows example tone plans that can be used for 1× symbol duration tone plan design with various FFT sizes, according to one embodiment. As shown in FIG. 13A, the 1× symbol duration will have different tone plan designs based on VHT or HE. FIG. 13B shows example tone plans that can be used for 2× symbol duration tone plan design with various FFT sizes, according to one embodiment. As shown in FIG. 13B, the 2× symbol duration will have different tone plan designs based on VHT or HE.

FIG. 13C shows example tone plans that can be used for 4× symbol duration tone plan design with various FFT sizes, according to one embodiment. As shown in FIG. 13C, the 4× symbol duration will have different tone plan designs based on HE or newly generated.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that can be described in this specification in the context of separate implementations also can be implemented in combination in a single implementation. Conversely, various features that can be described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave can be included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method for wireless communication, comprising:
identifying a transmission mode for transmitting a signal;
selecting a tone plan for transmission of the signal over a 320 MHz contiguous channel bandwidth based on the transmission mode, the tone plan being associated with a 256 point fast Fourier transform (FFT) size, a 512 point FFT size, a 1024 point FFT size, a 2048 point FFT size, or a 4096 point FFT size, the tone plan comprising a 320 MHz tone plan, a 240 MHz tone plan, a 160 MHz tone plan, or an 80 MHz tone plan, or a combination thereof; and
transmitting the signal over the 320 MHz contiguous channel bandwidth, wherein the transmitting comprises one of:
transmitting the signal over the entirety of the 320 MHz contiguous channel bandwidth based on the 320 MHz tone plan,
transmitting the signal over the 320 MHz contiguous channel bandwidth based on two duplicates of the 160 MHz tone plan, each duplicate of the 160 MHz tone plan being for a different 160 MHz sub-band of the 320 MHz contiguous channel bandwidth, or
transmitting the signal over the 320 MHz contiguous channel bandwidth based on four duplicates of the 80 MHz tone plan, each duplicate of the 80 MHz tone plan being a different 80 MHz sub-band of the 320 MHz contiguous channel bandwidth.

2. The method of claim 1, wherein a set of tones of the tone plan are spaced according to a 4× symbol duration of 12.8 μs with 78.125 kHz between subsequent tones.

3. The method of claim 2, wherein the 4× symbol duration is used with the 20 MHz tone plan, and the 20 MHz tone plane comprises 11 guard tones and 3 direct current tones.

4. The method of claim 2, wherein the 4× symbol duration is used with the 80 MHz tone plan, and the 80 MHz tone plan comprises 23 guard tones and 5 or 7 direct current tones.

5. The method of claim 1, wherein the transmission mode comprises one of:
the 320 MHz contiguous channel bandwidth;
two disjoint, contiguous 160 MHz channel bandwidths;
three disjoint channel bandwidths comprising a single contiguous 160 MHz channel bandwidth and two contiguous 80 MHz channel bandwidths;
four disjoint, contiguous 80 MHz channel bandwidths;
two disjoint, contiguous channel bandwidths comprising a first 160 MHz channel bandwidths and the other an 80 MHz channel bandwidths;
three non-contiguous 80 MHz channel bandwidths; or
a contiguous 240 MHz channel bandwidths.

6. The method of claim 5, wherein:
the 320 MHz contiguous channel bandwidth uses the three disjoint channel bandwidths comprising the single contiguous 160 MHz channel bandwidth and the two contiguous 80 MHz channel bandwidths; and
the transmission mode uses a single instance of the 160 MHz tone plan or two duplicates of the 80 MHz tone plan in one 160 MHz sub-band of the 320 MHz contiguous channel bandwidth, and two duplicates of the 80 MHz tone plan, each duplicate of the 80 MHz tone plan in one 80 MHz sub-band of the 320 MHz contiguous channel bandwidth.

7. The method of claim 5, wherein:
the 320 MHz contiguous channel bandwidth uses the four disjoint, contiguous 80 MHz channel bandwidths; and
the transmission mode uses four duplicates of the 80 MHz tone plan, each in one 80 MHz sub-band of the 320 MHz contiguous channel bandwidth.

8. The method of claim 5, wherein:
the transmission mode uses three duplicates of the 80 MHz tone plan, each duplicate of the 80 MHz tone plan in one 80 MHz sub-band of the 320 MHz contiguous channel bandwidth.

9. The method of claim 5, wherein the 80 and 160 MHz channel bandwidths use equal symbol durations.

10. The method of claim 5, wherein a first channel bandwidth that forms the 320 MHz contiguous channel bandwidth utilizes a different symbol duration from at least a second channel bandwidth that forms the 320 MHz contiguous channel bandwidth.

11. The method of claim 1, wherein the tone plan comprises at least one of a 26-, a 52-, a 106-, a 242-, a 484-, a 996-, a 2×996-, and a 4×996 tone resource unit.

12. The method of claim 1, wherein the tone plan comprises a minimum resource unit size of 52 tones.

13. The method of claim 1, wherein the tone plan comprises a minimum resource unit size of 106 tones.

14. The method of claim 1, wherein the selected tone plan comprises at least one instance of the 80 MHz tone plan or the 160 MHz tone plan, at least 23 guard tones, 5 direct current tones for non-orthogonal frequency division multiple access (OFDMA) communications or 7 direct current tones for multiple user communications; wherein the 2048 point FFT size comprises up to 2020 data and pilot tones for non-OFDMA communications or up to 2018 data and pilot tones for multiple user communications, and the 4096 point FFT size comprises up to 4068 data and pilot tones for non-OFDMA communications or up to 4066 data and pilot tones for multiple user communications.

15. An apparatus for wireless communication, comprising:
a processor,
memory in electronic communication with the processor; and
instructions stored in the memory and executable by the processor to cause the apparatus to:
identify a transmission mode for transmitting a signal;
select a tone plan for transmission of the signal over a 320 MHz contiguous channel bandwidth based on the transmission mode, the tone plan being associated with a 256 point fast Fourier transform (FFT)

size, a 512 point FFT size, a 1024 point FFT size, a 2048 point FFT size, or a 4096 point FFT size, the tone plan comprising a 320 MHz tone plan, a 240 MHz tone plan, a 160 MHz tone plan, or an 80 MHz tone plan, or a combination thereof; and transmit the signal over the 320 MHz channel bandwidth, wherein the transmitting comprises one of:
  transmit the signal over the entirety of the 320 MHz channel bandwidth based on the 320 MHz tone plan,
  transmit the signal over the 320 MHz channel bandwidth based on two duplicates of the 160 MHz tone plan, each duplicate of the 160 MHz tone plan being for a different 160 MHz sub-band of the 320 MHz channel bandwidth, or
  transmit the signal over the 320 MHz channel bandwidth based on four duplicates of the 80 MHz tone plan, each duplicate of the 80 MHz tone plan being a different 80 MHz sub-band of the 320 MHz channel bandwidth.

16. The apparatus of claim 15, wherein a set of tones of the tone plan are spaced according to a 4× symbol duration of 12.8 μs with 78.125 kHz between subsequent tones.

17. The apparatus of claim 16, wherein the 4× symbol duration is used with the 20 MHz tone plan, and the 20 MHz tone plan comprises 11 guard tones and 3 direct current tones.

18. The apparatus of claim 16, wherein the 4× symbol duration is used with the 80 MHz tone plan, and the 80 MHz tone plan comprises 23 guard tones and 5 or 7 direct current tones.

19. The apparatus of claim 15, wherein the transmission mode comprises one of:
  the 320 MHz contiguous channel bandwidth;
  two disjoint, contiguous 160 MHz channel bandwidths;
  three disjoint channel bandwidths comprising a single contiguous 160 MHz channel bandwidth and two contiguous 80 MHz channel bandwidths;
  four disjoint, contiguous 80 MHz channel bandwidths;
  two disjoint, contiguous channel bandwidths comprising a first 160 MHz channel bandwidth and the other an 80 MHz channel bandwidth;
  three non-contiguous 80 MHz channel bandwidths; or
  a contiguous 240 MHz channel bandwidth.

20. The apparatus of claim 19, wherein:
  the 320 MHz contiguous channel bandwidth uses the three disjoint channel bandwidths comprising the single contiguous 160 MHz channel bandwidth and the two contiguous 80 MHz channel bandwidths; and
  the transmission mode uses a single instance of the 160 MHz tone plan or two duplicates of the 80 MHz tone plan in one 160 MHz sub-band of the 320 MHz contiguous channel bandwidth, and two duplicates of the 80 MHz tone plan, each duplicate of the 80 MHz tone plan in one 80 MHz sub-band of the 3230 MHz contiguous channel bandwidth.

21. The apparatus of claim 19, wherein:
  the 320 MHz contiguous channel bandwidth is the four disjoint, contiguous 80 MHz channel bandwidths; and
  the transmission mode uses four duplicates of the 80 MHz tone plan, each in one 80 MHz sub-band of the 320 MHz contiguous channel bandwidth.

22. The apparatus of claim 19, wherein:
  the transmission mode uses three duplicates of the 80 MHz tone plan, each duplicate of the 80 MHz tone plan in one 80 MHz PHY sub-band of the 320 MHz contiguous channel bandwidth.

23. The apparatus of claim 19, wherein the 80 and 160 MHz channel bandwidths use equal symbol durations.

24. The apparatus of claim 19, wherein a first channel bandwidth that forms the 320 MHz contiguous channel bandwidth utilizes a different symbol duration from at least a second channel bandwidth that forms the 320 MHz contiguous channel bandwidth.

25. The apparatus of claim 15, wherein the tone plan comprises at least one of a 26-, a 52-, a 106-, a 242-, a 484-, a 996-, a 2×996-, and a 4×996 tone resource unit.

26. The apparatus of claim 15, wherein the tone plan comprises a minimum resource unit size of 52 tones.

27. The apparatus of claim 15, wherein the tone plan comprises a minimum resource unit size of 106 tones.

28. The apparatus of claim 15, wherein the apparatus is an access point, and wherein the signal is transmitted through a transmitter and an antenna of the access point to a mobile station served by the access point.

29. The apparatus of claim 15, wherein the selected tone plan comprises at least one instance of the 80 MHz tone plan or the 160 MHz tone plan, at least 23 guard tones, 5 direct current tones for non-orthogonal frequency division multiple access (OFDMA) communications or 7 direct current tones for multiple user communications; wherein the 2048 point FFT size comprises up to 2020 data and pilot tones for non-OFDMA communications or up to 2018 data and pilot tones for multiple user communications, and the 4096 point FFT size comprises up to 4068 data and pilot tones for non-OFDMA communications or up to 4066 data and pilot tones for multiple user communications.

30. An apparatus for wireless communication, comprising:
  means for identifying a transmission mode for transmitting a signal;
  means for selecting a tone plan for transmission of the signal over a 320 MHz contiguous channel bandwidth based on the transmission mode, the tone plan being associated with a 256 point fast Fourier transform (FFT) size, a 512 point FFT size, a 1024 point FFT size, a 2048 point FFT size, or a 4096 point FFT size, the tone plan comprising a 320 MHz tone plan, a 240 MHz tone plan, a 160 MHz tone plan, or an 80 MHz tone plan, or a combination thereof; and
  means for transmitting the signal over the 320 MHz channel bandwidth, wherein the transmitting comprises one of:
    means for transmitting the signal over the entirety of the 320 MHz channel bandwidth based on the 320 MHz tone plan,
    means for transmitting the signal over the 320 MHz channel bandwidth based on two duplicates of the 160 MHz tone plan, each duplicate of the 160 MHz tone plan being for a different 160 MHz sub-band of the 320 MHz channel bandwidth, or
    means for transmitting the signal over the 320 MHz channel bandwidth based on four duplicates of the 80 MHz tone plan, each duplicate of the 80 MHz tone plan being a different 80 MHz sub-band of the 320 MHz channel bandwidth.

31. A non-transitory computer-readable medium storing code for wireless communication, the code comprising instructions executable by a processor to:
  identify a transmission mode for transmitting a signal;
  select a tone plan for transmission of the signal over a 320 MHz contiguous channel bandwidth based on the transmission mode, the tone plan being associated with a 256 point fast Fourier transform (FFT) size, a 512 point FFT size, a 1024 point FFT size, a 2048 point FFT size, or a 4096 point FFT size, the tone plan comprising a 320 MHz tone plan, a 240 MHz tone plan, a 160 MHz tone plan, or an 80 MHz tone plan, or a combination thereof; and transmit the signal over the 320 MHz channel bandwidth, wherein the transmitting comprises one of:
- transmit the signal over the entirety of the 320 MHz channel bandwidth based on the 320 MHz tone plan,
- transmit the signal over the 320 MHz channel bandwidth based on two duplicates of the 160 MHz tone plan, each duplicate of the 160 MHz tone plan being for a different 160 MHz sub-band of the 320 MHz channel bandwidth, or
- transmit the signal over the 320 MHz channel bandwidth based on four duplicates of the 80 MHz tone plan, each duplicate of the 80 MHz tone plan being a different 80 MHz sub-band of the 320 MHz channel bandwidth.

32. A method for wireless communication, comprising:
identifying a transmission mode for transmitting a signal;
selecting a tone plan for transmission of the signal over a 320 MHz contiguous channel bandwidth or a 320 MHz disjoint channel bandwidth based on the transmission mode, the tone plan being associated with a 256 point fast Fourier transform (FFT) size, a 512 point FFT size, a 1024 point FFT size, a 1024 point FFT size, a 2048 point FFT size, or a 4096 point FFT size, the tone plan comprising a 320 MHz tone plan, a 240 MHz tone plan, a 160 MHz tone plan, or an 80 MHz tone plan, or a combination thereof; and transmitting the signal over the 320 MHz contiguous channel bandwidth or the 320 MHz disjoint channel bandwidth, wherein the transmitting comprises one of:
- transmitting the signal over the 320 MHz contiguous channel bandwidth based on two duplicates of the 160 MHz tone plan, each duplicate of the 160 MHz tone plane being for a different 160 MHz sub-band of the 320 MHz contiguous channel bandwidth, or
- transmitting the signal over the 320 MHz disjoint channel bandwidth based on four duplicate 80 MHz tone plans, each duplicate 80 MHz tone plan in one 80 MHz sub-band, wherein the 320 MHz disjoint channel bandwidth comprises two disjoint, contiguous 160 MHz frequency bands.

* * * * *